US009622088B2

(12) United States Patent
Sawai

(10) Patent No.: US 9,622,088 B2
(45) Date of Patent: *Apr. 11, 2017

(54) COMMUNICATION SYSTEM, COMMUNICATION DEVICE, PROGRAM AND COMMUNICATION CONTROL METHOD

(71) Applicant: SONY CORPORATION, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,895

(22) Filed: Dec. 18, 2015

(65) Prior Publication Data
US 2016/0105805 A1 Apr. 14, 2016

Related U.S. Application Data

(63) Continuation of application No. 14/330,155, filed on Jul. 14, 2014, now Pat. No. 9,237,456, which is a (Continued)

(30) Foreign Application Priority Data

Jan. 14, 2009 (JP) ................................. 2009-005911

(51) Int. Cl.
H04W 72/04 (2009.01)
H04W 16/14 (2009.01)

(52) U.S. Cl.
CPC .......... H04W 16/14 (2013.01); H04W 72/04 (2013.01); H04W 72/0406 (2013.01); H04W 72/0426 (2013.01); H04W 72/042 (2013.01)

(58) Field of Classification Search
CPC .......... H04W 72/005; H04W 72/04–72/0406; H04W 72/0426; H04W 72/046; H04W 16/00–16/32
(Continued)

(56) References Cited

U.S. PATENT DOCUMENTS 7,813,318 B2   10/2010 Hu
7,876,786 B2 *  1/2011 Bahl ..................... H04L 5/0032
                                                 370/344
(Continued)

FOREIGN PATENT DOCUMENTS

EP   1 750 466 A1   2/2007
EP   2 356 844 A1   8/2011
(Continued)

OTHER PUBLICATIONS

Extended Search Report issued Feb. 16, 2016 in European Patent Application No. 15195104.3.
(Continued)

Primary Examiner — Afsar M Qureshi
(74) Attorney, Agent, or Firm — Oblon, McClelland, Maier & Neustadt, L.L.P.

(57) ABSTRACT

There is provided a communication system comprising: a first communication device that senses a communication environment surrounding the first communication device; a second communication device that acquires sensed data sensed by the first communication device; and a third communication device that determines availability of usage of a second communication service using a part or whole of a spectrum assigned to a first communication service based on the sensed data transmitted from the second communication device.

15 Claims, 15 Drawing Sheets

Related U.S. Application Data continuation of application No. 13/734,256, filed on Jan. 4, 2013, now Pat. No. 8,811,328, which is a continuation of application No. 12/683,975, filed on Jan. 7, 2010, now Pat. No. 8,369,274.

(58) Field of Classification Search
USPC .................................................. 370/329, 338
See application file for complete search history.

(56) References Cited

U.S. PATENT DOCUMENTS

| | | | |
|---|---|---|---|
| 7,965,641 B2 | 6/2011 | Ben Letaief et al. | |
| 8,116,687 B2 | 2/2012 | Patel | |
| 8,279,767 B2 | 10/2012 | Kang et al. | |
| 8,369,274 B2* | 2/2013 | Sawai | H04W 16/14 370/328 |
| 8,811,328 B2* | 8/2014 | Sawai | H04W 16/14 370/329 |
| 2006/0063543 A1* | 3/2006 | Matoba | H04L 1/0003 455/509 |
| 2007/0026868 A1 | 2/2007 | Schulz et al. | |
| 2007/0032254 A1* | 2/2007 | Chen | H04W 16/14 455/509 |
| 2007/0253394 A1* | 11/2007 | Horiguchi | H04W 16/14 370/338 |
| 2008/0261639 A1* | 10/2008 | Sun | H04W 16/14 455/515 |
| 2010/0142454 A1* | 6/2010 | Chang | H04W 16/06 370/329 |
| 2010/0185749 A1 | 7/2010 | Sawai | |
| 2010/0302948 A1 | 12/2010 | Sawai et al. | |
| 2011/0165903 A1* | 7/2011 | Selen | H04W 16/14 455/509 |
| 2011/0228693 A1 | 9/2011 | Larsson et al. | |
| 2011/0275322 A1 | 11/2011 | Sawai et al. | |
| 2011/0310767 A1 | 12/2011 | Hu | |

FOREIGN PATENT DOCUMENTS

| | | |
|---|---|---|
| JP | 2000-196967 A | 7/2000 |
| JP | 2005-523616 | 8/2005 |
| JP | 2006-211313 A | 8/2006 |
| JP | 2006-287463 | 10/2006 |
| JP | 2007-088941 | 4/2007 |
| JP | 2007-88941 A | 4/2007 |
| JP | 2007-300419 | 11/2007 |
| JP | 2007-300419 A | 11/2007 |
| WO | WO 2008/039872 A2 | 4/2008 |
| WO | WO 2008/129660 A1 | 10/2008 |
| WO | WO 2010/056181 A1 | 5/2010 |

OTHER PUBLICATIONS

Communication issued by the Japanese Patent Office on Sep. 30, 2014 for Japanese Application No. 2012-280803.

Jim Rabb, "A New Regulatory and Technical Environment for Wireless Broadband: A Primer on the IEEE 802.11y Amendment", IEEE Mentor, Nov. 10, 2008.

"Facilitating Opportunities for Flexible, Efficient, and Reliable Spectrum Use Employing Cognitive Radio Technologies", Notice of Proposed Rule Making and Order, FC-03-0322, FCC, Dec. 30, 2003.

Martial Bellec et al., "A PHY/MAC Proposal for IEEE 802.22 WRAN Systems", IEEE 802.22-06/0005r1, Jan. 2006.

Milind M. Buddhikot et al., "DIMSUMNet: New Directions in Wireless Networking Using Coordinated Dynamic Spectrum Access (Position Paper)", Proceedings on the Sixth IEEE International Symposium on a World of Wireless Mobile and Multimedia Networks, Jun. 13-16, 2005, pp. 78-85.

Peter Ecclesine, "TGy LB106 Submission for DSE Comments", IEEE 802.11-07/2080r0, IEEE mentor, Jul. 9, 2007.

Office Action issued Mar. 31, 2015 in Japanese Patent Application No. 2012-280803.

Office Action issued on Sep. 30, 2014 for Japanese Application No. 2012-280803.

Japanese Office Action issued Jun. 21, 2016 in Patent Application No. 2015-130807 (with English translation).

"Second Report and Order and Memorandum Opinion and Order" Federal Communications Commission FCC 08-260, Nov. 14, 2008, pp. 1-130.

\* cited by examiner

COMMUNICATION SYSTEM, COMMUNICATION DEVICE, PROGRAM AND COMMUNICATION CONTROL METHOD

CROSS-REFERENCE TO RELATED APPLICATIONS

This application is a continuation of U.S. application Ser. No. 14/330,155, filed Jul. 14, 2014 (now U.S. Pat. No. 9,237,456 which issued Jan. 12, 2016), which is a continuation of U.S. application Ser. No. 13/734,256, filed Jan. 4, 2013 (now U.S. Pat. No. 8,811,328 which issued Aug. 19, 2014), which is a continuation of U.S. application Ser. No. 12/683,975, filed Jan. 7, 2010 (now U.S. Pat. No. 8,369,274 which issued Feb. 5, 2013), which claims the benefit of priority to JP 2009-005911, filed in the Japanese Patent Office on Jan. 14, 2009; each of which are incorporated herein by reference in their entirety.

BACKGROUND OF THE INVENTION

Field of the Invention

The present invention relates to a communication system, a communication device, a program and a communication control method.

Description of the Related Art

Discussions have been taking place recently regarding secondary usage of a spectrum assigned for primary usage to provide a secondary communication service depending on the use condition of the spectrum. For example, the standard specification for allowing an unused channel contained in a spectrum of the U.S. digital TV broadcast (TV white spaces) to be available for radio communication has been studied in the IEEE802.22 working group ("IEEE802.22WG on WRANs", [online], [Searched on Jan. 5, 2009], cf. Internet <URL: http://www.ieee802.org/22/>). Further, according to the report from the Federal Communications Commission (FCC) on November 2008, the discussions are directed toward permitting secondary usage of TV white spaces by using specific communication devices that have been authorized by fulfilling a certain criterion ("Second Report and Order and Memorandum Opinion and Order", [online], [Searched on Jan. 5, 2009], cf. Internet <URL: http://hraunfoss.fcc.gov/edocs_public/attachmatch/FCC-08-260A1.pdf>). In addition, there are moves, led by the EU, afoot to universally allocate a dedicated control channel called the cognitive pilot channel (CPC) for making dynamic spectrum access (DSA). Technological studies for a secondary usage system that makes DSA are also being progressed in IEEE Standards Coordinating Committee (SCC) 41.

SUMMARY OF THE INVENTION

However, in the implementation of a secondary usage system, no case has been reported which presents a system model that classifies functions to be incorporated into communication devices joining the system so that secondary usage of a spectrum can be achieved efficiently based on such a classification.

In light of the foregoing, it is desirable to provide a novel and improved communication system, communication device, program and communication control method that enable efficient implementation of secondary usage of a spectrum.

According to an embodiment of the present invention, there is provided a communication system including: a first communication device that senses a communication environment surrounding the first communication device; a second communication device that acquires sensed data sensed by the first communication device; and a third communication device that determines availability of usage of a second communication service using a part or whole of a spectrum assigned to a first communication service based on the sensed data transmitted from the second communication device.

Based on the sensed data, when a spectrum to be used by the second communication service is not actually used by the first communication service, the third communication device may determine that the spectrum is available for the second communication service.

When the third communication device determines that usage of the second communication service is available, the third communication device may request another communication device to permit start of usage of the second communication service.

The third communication device may be a device permitted in advance to decide start of usage of the second communication service, and then, when the third communication device determines that usage of the second communication service is available, the third communication device may start the second communication service.

The third communication device may further receive, from another communication device capable of determining availability of usage of the second communication service, sensed data acquired by said another communication device, and determine availability of extension of a service area of the second communication service based on the received sensed data.

The sensed data acquired by said another communication device may be sensed data sensed by yet another communication device.

The second communication device may transmit sensed data acquired by another communication device and sensed data acquired by the second communication device to the third communication device.

The third communication device may relay a communication packet for the first communication service transmitted from the first communication device or the second communication device to another communication device.

The third communication device may acquire regulatory information from another communication device and determine availability of usage of the second communication service based further on the regulatory information.

The third communication device may transmit a result of hard decision on the sensed data to a communication device to which permission for start of usage of the second communication service is requested.

The third communication device may evaluate reliability of each sensed data by comparing the sensed data acquired by a plurality of communication devices with one another.

The second communication device may perform communication with said another communication device acquiring the sensed data by using an autonomous distributed communication protocol.

According to another embodiment of the present invention, there is provided a communication device including: a communication unit that receives sensed data related to a communication environment surrounding another communication device sensed by said another communication device and; a determination unit that determines availability of usage of a second communication service using a part or whole of a spectrum assigned to a first communication service.

According to another embodiment of the present invention, there is provided a program causing a computer controlling a communication device to implement functions including: a communication unit that receives sensed data related to a communication environment surrounding another communication device sensed by said another communication device and; a determination unit that determines availability of usage of a second communication service using a part or whole of a spectrum assigned to a first communication service.

According to another embodiment of the present invention, there is provided a communication control method including the steps of: sensing, by a first communication device, a communication environment surrounding the first communication device; acquiring, by a second communication device, sensed data sensed by the first communication device; and determining, by a third communication device, availability of usage of a second communication service using a part or whole of a spectrum assigned to a first communication service based on the acquired sensed data.

According to the embodiments of the present invention described above, it is possible to provide a communication system, a communication device, a program and a communication control method that enable efficient implementation of secondary usage of a spectrum.

DETAILED DESCRIPTION OF THE EMBODIMENT(S)

Figure 1:
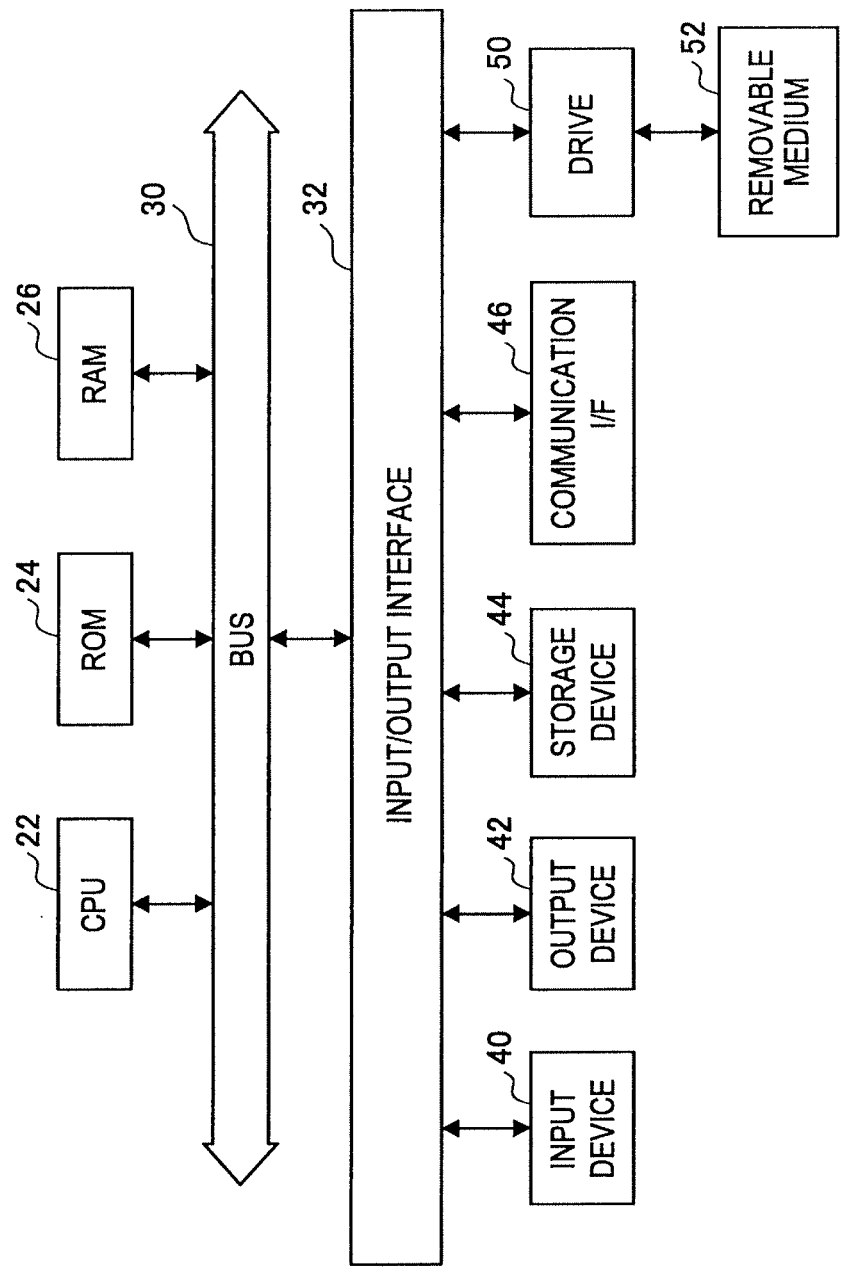
FIG. 1 is a block diagram showing an example of a hardware configuration of a communication device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Functional Classification for Secondary Usage of Spectrum
2. Exemplary Configuration of Communication Device
3. Exemplary Configuration of Communication System
4. Example of Data Exchanged between Nodes <1. Functional Classification for Secondary Usage of Spectrum>

Firstly, the principal functions (FC: Function Class) to be incorporated into communication devices that join a system in order to implement secondary usage of a spectrum are listed below. A communication device that joins a system incorporates one or more than one of the seven functions (FC1 to FC7) listed below.

FC1: Secondary communication authentication node
FC2: Primary communication relay node
FC3: Advanced determination node
FC4: Determination node
FC5: Smart sensor node
FC6: Sensor node
FC7: Communication node

[1-1. Secondary Communication Authentication Node (FC1)]

The secondary communication authentication node (FC1) permits start or extension of a communication service related to secondary usage (which is referred to hereinafter as a second communication service) in accordance with the spectrum policy when it is determined that secondary usage of a spectrum is available by the advanced determination node or the determination node, which are described later. For example, the secondary communication authentication node keeps a black list listing up authentication IDs, terminal IDs, device IDs, sensor IDs or the like of devices which have done unfair spectrum usage in the past. The secondary communication authentication node then cross-checks an ID of a node which requested start or extension of a second communication service with the black list and may permits start or extension of the second communication service when the ID of the node does not exist in the black list. If a base station which knows a traffic of the first communication service is the secondary communication authentication node, the secondary communication authentication node may recognize time periods or areas where many channels are vacant based on a history of the user traffic. The secondary communication authentication node may then try to make efficient use of spectrum by permitting secondary usage for the time periods or areas where many channels are vacant. Further, the secondary communication authentication node may generate, acquire or update information to be used for determination about the availability of secondary usage by the advanced determination node or the determination node and supply the information to the advanced determination node or the determination node. The information to be used for determination about the availability of secondary usage contains community-based or service area based regulatory information such as a power level usable for sensing and system information (for example, band or bandwidth currently in use) provided by neighboring base stations, for example. The secondary communication authentication node can thus serve as a so-called coordinator of the second communication service.

There are two kinds of secondary communication authentication nodes: a permanent secondary communication authentication node and a temporary secondary communication authentication node. The permanent secondary communication authentication node is a communication device that is authorized to coordinate the second communication service because it meets a predetermined criterion set by statute or the like. On the other hand, the temporary secondary communication authentication node is a communication device that receives authority from the permanent secondary communication authentication node because it meets a specific criterion according to a communication environment or the like and thereby temporarily makes coordination of the second communication service within the range of the granted authority (for example, within a range of the limited frequency channels or resource blocks, or within a range of a transmission power under a specific maximum value). Herein, "coordination" of a communication service may contain, for example, allocation of resources for the communication service. The temporary secondary communication authentication node may, for example, perform collaborative resource allocation for a second communication service by exchanging scheduling information each other with the permanent secondary communication authentication node. Further, the permanent secondary communication authentication node may verify a reliability of the temporary secondary communication authentication node by matching a traffic known by the node receiving a temporary authority with a traffic known by the permanent secondary communication authentication node itself, when granting the authority to male coordination of the second communication service to the temporary secondary communication authentication node. The verification of reliability herein is adopted to make sure that sensing capability of the node receiving a temporary authority is capable of figuring out the condition of channels accurately. In this case, for example, a node requesting a temporary authority firstly transmits measurements of traffic and time information regarding the measurements of traffic to the permanent secondary communication authentication node. Secondly, the permanent secondary communication authentication node matches the received measurements of traffic with a (real) traffic values held in itself. The permanent secondary communication authentication node then give a temporary authority to coordinate a second communication service to it only in a case that the received measurements of traffic is verified to be correct. At this time, the permanent secondary communication authentication node may give an authority indirectly by providing an information about available channel, band or time slots for the temporary secondary communication authentication node.

[1-2. Primary Communication Relay Node (FC2)]

The primary communication relay node (FC2) serves as a pseudo base station or access point that, when connected with a communication service related to primary usage (which is referred to hereinafter as a first communication service), allows nearby nodes to use the first communication service.

[1-3. Advanced Determination Node (FC3)]

The advanced determination node (FC3) determines whether extension of a communication network related to secondary usage (which is referred to hereinafter as a second communication network) is available based on a secondary communication profile acquired from the determination node, which is described later. The secondary communication profile typically contains sensed data (including link data statistically calculated from sensed data), which is specifically described later. The secondary communication profile may further contain scheduling information for each of the second communication services. The secondary communication profile may further contain an identifier of the spectrum policy assigned to each determination node or the like. The advanced determination node, for example, may determine an extension of an area of a second communication network to a node belonging to another second communication network is available, when designated criterion values or database servers to use according to the regulatory information to which a plurality of determination nodes conform are in common. Alternatively, the advanced determination node may determine an extension of a second communication network is available, when all of the second communication networks satisfy the severest one of the criterion values designated by the plural regulatory information. Alternatively, the advanced determination node may decide to extend a second communication network by utilizing a frequency band in common, when the commonly available frequency band is found as a result of query to a database server approved according to the regulatory information. Further, in a case that a node belonging to a second communication network intends to perform data exchange with another node belonging to another second communication network, the advanced determination node may extend an area of a second communication network to the another node belonging to the another second communication network only for the purpose of relaying or multi-hopping the intended data. Furthermore, the advanced determination node may determine an extension of a second communication network is available, when it is possible to raise the maximum transmission power without causing an adverse effect to the first communication service by utilizing a interference control technology based on beam forming or transmission power control. If the advanced determination node determines that extension of the second communication network is available, it requests the secondary communication authentication node to permit extension of the second communication network. Typically, the advanced determination node has a function of the determination node, which is described later, also. It should be noted that, when the advanced determination node and the secondary communication authentication node exist on a physically same device, a communication between the advanced determination node and the secondary communication authentication node is performed as a communication between logical functions (or it may be omitted). On the other hand, when the advanced determination node and the secondary communication authentication node exist on physically different devices, a communication between the advanced determination node and the secondary communication authentication node is performed using either wireless ling or wired link. The wireless link herein may be a wireless link based on the first communication service, for example. The wired link herein may be a link either on a private network (for example, core network) or on a public network (for example, ADSL).

[1-4. Determination Node (FC4)]

The determination node (FC4) determines whether secondary usage of a spectrum is available according to the spectrum policy based on sensed data sensed or acquired by the smart sensor node or the sensor node (may be implemented on the same device of the determination node or on a different device from it), which are described later. The determination node may, for example, determine secondary usage of a spectrum is available when a power level or energy (or an average value thereof over a certain period) of received signals measured in the target frequency band is lower than the criterion value designated by the regulatory information (or by a database server approved by the regulatory information). Alternatively, the determination node may determine secondary usage is available for a channel which is considered to be vacant based on scheduling information which is acquired from downlink reference signal. If the determination node determines that secondary usage of a spectrum is available for the frequency band selected as a target of secondary usage based on the sensed or acquired data. If the determination node determines that secondary usage of a spectrum is available, it requests the secondary communication authentication node to permit start of the second communication service. Then, if start of the second communication service is permitted by the secondary communication authentication node, the determination node invites users of the second communication service by transmitting a beacon to nearby communication devices, for example, and starts the second communication service. Beacons transmitted by the determination node may be used by the nearby communication devices for detection, synchronization, acquisition of system information and the like regarding the second communication service. For example, primary synchronization signal and secondary synchronization signal, signals on PBCH (Physical Broadcast Channel) or the like are an example of the above-described beacons. The determination node thus serves as an engine for cognitive radio that switches from the first communication service to the second communication service. Further, the determination node generates the secondary communication profile in response to an instruction from the above-described advanced determination node and transmits the profile to the advanced determination node. It should be noted that, similarly to the above description about the advanced determination node, a communication between the determination node and the secondary communication authentication node is also performed as a communication between logical functions (In a case that they are on the same device. But the above communication processes may be omitted) or as a communication using wireless ling or wired link (In a case that they are on different devices).

[1-5. Smart Sensor Node (FC5)]

The smart sensor node (FC5) acquires sensed data related to a communication environment stored in each node from the sensor node or the smart sensor node located in the nearby vicinity of its own device. The smart sensor node may further add sensed data sensed in its own device to the acquired sensed data (or use the sensed data sensed in its own device only). The smart sensor node thus serves as an extended sensor capable of acquiring sensed data necessary for determination of secondary usage in collaboration with the nearby nodes. Further, the smart sensor node transmits the stored sensed data in response to an instruction from the smart sensor node or the determination node.

[1-6. Sensor Node (FC6)]

The sensor node (FC6) senses the communication environment surrounding its own device and generates sensed data. As described later in detail, the sensed data is typically data indicating the surrounding communication environment relating to the first communication service. For example, a power level or energy of received signals or scheduling information of the first communication service may be used as data indicating the surrounding communication environment. The sensor node thus serves as a sensor that generates sensed data necessary for determination of secondary usage.

Further, the sensor node transmits the generated sensed data in response to an instruction from the smart sensor node or the determination node.

[1-7. Communication Node (FC7)]

The communication node (FC7) performs communication using the second communication service when secondary usage of a spectrum is available. The communication node thus serves as a general communication device. A communication protocol used for the second communication service may be a desired communication protocol such as IEEE802.11a/b/g/n/s, Zigbee or WiMedia, for example.

[1-8. Scope of the Term "Secondary Usage"]

In this specification, the term "secondary usage" typically means utilization of an additional or alternative communication service (a second communication service) using a part or whole of a spectrum assigned to a first communication service as described above. In this context about the meaning of the term "secondary usage", the first communication service and the second communication service may be services of different types or the same type. The services of different types may be selected from services such as digital TV broadcasting service, satellite communication service, mobile communication service, wireless LAN access service, P2P (Peer To Peer) connection service and the like. On the other hand, services of the same type may contain, for example, a relationship between a service of macro-cell provided by a communication carrier and a service of femto-cell operated by users or MVNO (Mobile Virtual Network Operator). Additionally, services of the same type may contain, for example, a relationship between a service provided by a base station of a communication service according to WiMAX, LTE (Long Term Evolution), LTE-A (LTE-Advanced) or the like and a service provided by relay station (relay node) to cover a spectrum hole. Further, a second communication service may be a service utilizing a plurality of fragmentary frequency bands aggregated using spectrum aggregation technology. Furthermore, a second communication service may be a supplementary communication service provided by femto-cells, relay stations or small or medium sized base stations for smaller service area than normal sized base stations within a service area of a normal sized base station. The subject matter of each embodiment described in this specification is applicable to every type of mode of such secondary usages.

<2. Exemplary Configuration of Communication Device>

A configuration of a communication device that incorporates one or more than one of the functions FC1 to FC7 listed in the previous section is described hereinbelow.

FIG. 1 is a block diagram showing an example of a hardware configuration of a communication device according to an embodiment of the present invention. Referring to FIG. 1, a communication device according to an embodiment includes a central processing unit (CPU) 22, read only memory (ROM) 24, random access memory (RAM) 26, a bus 30, an input/output interface 32, an input device 40, an output device 42, a storage device 44, a communication interface (I/F) 46 and a drive 50.

In FIG. 1, the CPU 22 controls the operation of a general-purpose computer as a whole. The ROM 24 stores programs executed by the CPU 22, data and so on. The RAM 26 temporarily stores a program or data during execution of processing by the CPU 22.

The CPU 22, the ROM 24 and the RAM 26 are connected with one another through the bus 30. The input/output interface 32 is also connected to the bus 30.

The input/output interface 32 connects the CPU 22, the ROM 24 and the RAM 26 with the input device 40, the output device 42, the storage device 44, the communication interface 46 and the drive 50.

The input device 40 receives an instruction or information input from a user through a button, a switch, a lever, a mouse, a keyboard, a touch panel or the like, for example. The output device 42 outputs information to a user through a display device such as a cathode ray tube (CRT), a liquid crystal display or an organic light emitting diode (OLED), a light emitting device such as a lamp, or an audio output device such as a speaker, for example. The storage device 44 is made up of a hard disk drive or flash memory, for example, and stores programs, data and so on. The communication interface 46 mediates communication processing for the first communication service or the second communication service. A removable medium 52 is loaded to the drive 50 according to need.

Each of the functions FC1 to FC7 listed in the previous section may be implemented as software, for example. In the case where each function is implemented as software, for example, a program constituting software is stored in the ROM 24 or the storage device 44 shown in FIG. 1, loaded to the RAM 26 upon execution and executed by the CPU 22. Accordingly, the CPU 22 can serve as the secondary communication authentication node (FC1), the primary communication relay node (FC2), the advanced determination node (FC3), the determination node (FC4), the smart sensor node (FC5), the sensor node (FC6) or the communication node (FC7), for example. Alternatively, each function may be implemented as hardware by using a dedicated processor which is additionally mounted to the communication device.

<3. Exemplary Configuration of Communication System>

A communication system that is made up of communication devices each having one or more than one of the functions FC1 to FC7 is described hereinafter.

[3-1. General System Configuration]

Figure 14:
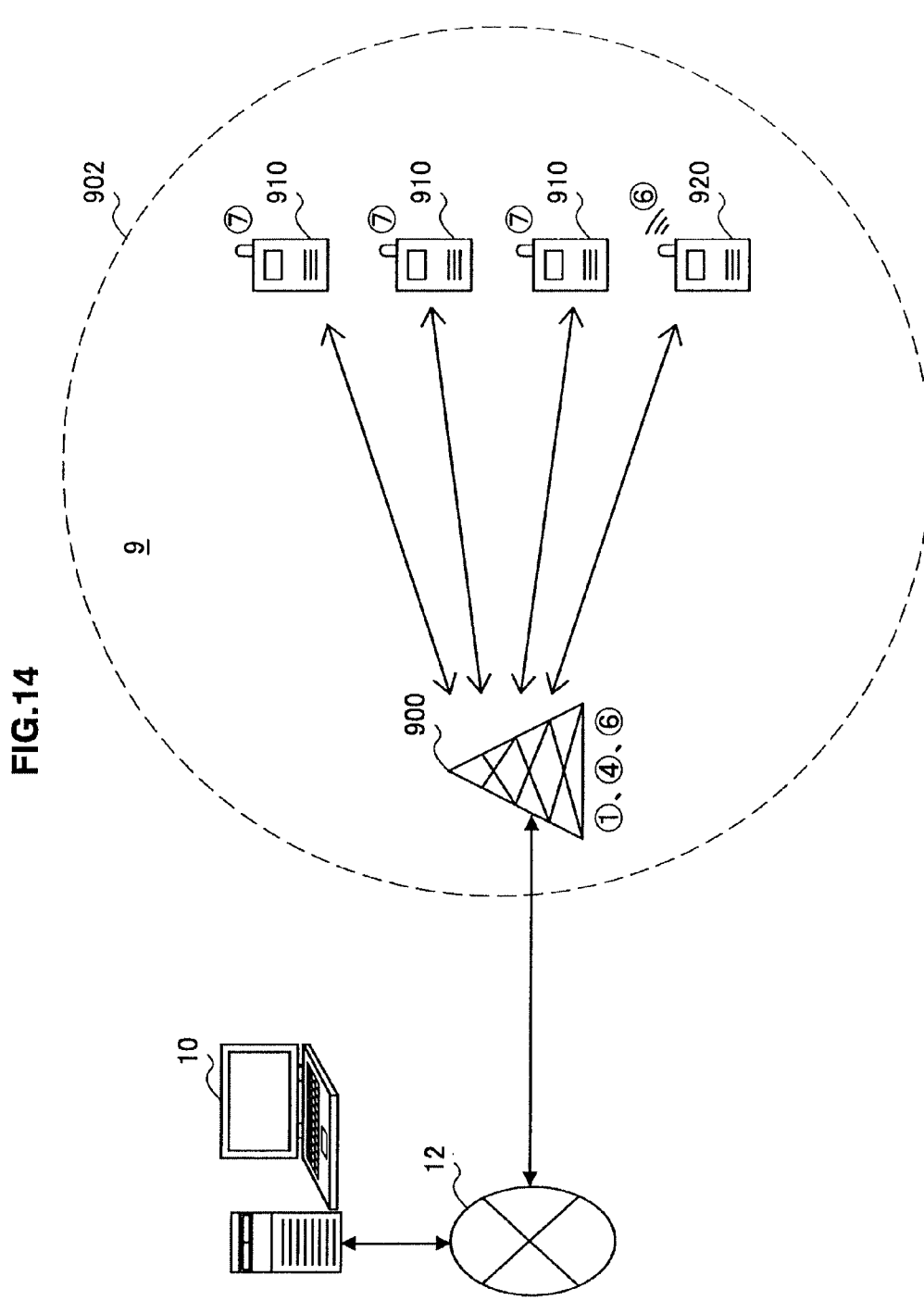
FIG. 14 is a schematic view showing a configuration of a general communication system that implements secondary usage of a spectrum.
Figure 15:
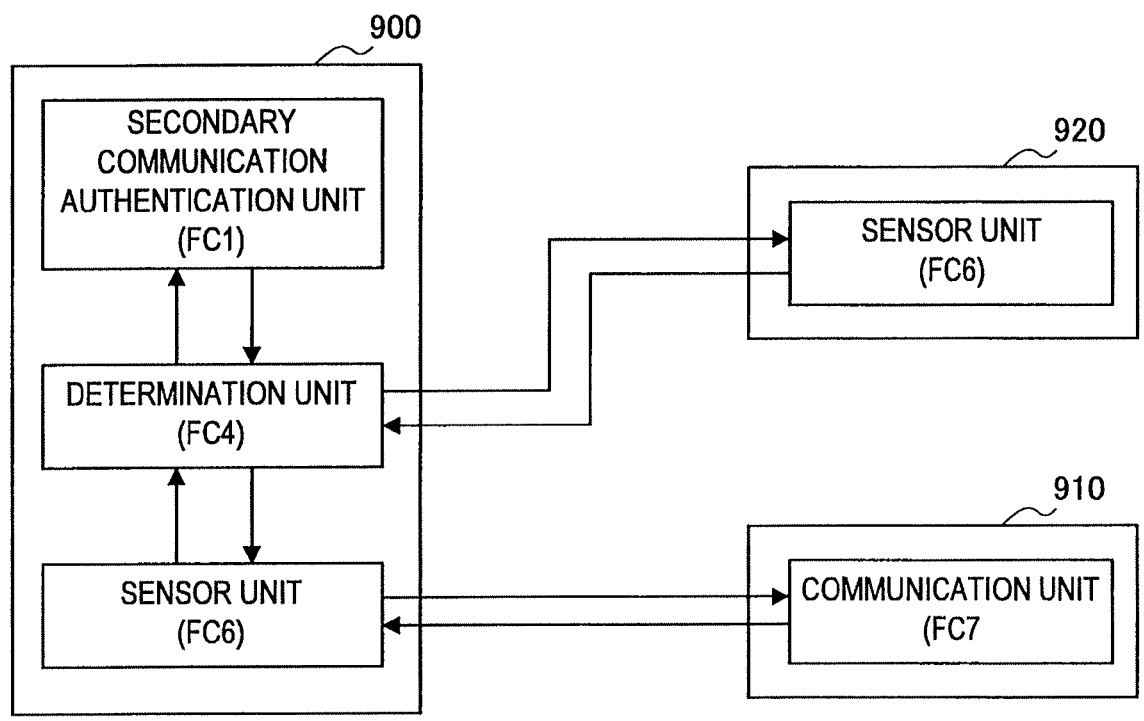
FIG. 15 is a block diagram showing an example of a functional layout in the communication system of FIG. 14.

FIG. 14 is a schematic view showing an example of configuration of a general communication system 9 conforming to the IEEE 802.22 standard specification. Circled numerals in FIG. 14 correspond to the numbers of the functions (FC) described above. FIG. 15 is a block diagram showing an example of a functional layout among devices in the communication system 9 shown in FIG. 14.

Referring to FIG. 14, the communication system 9 includes a base station 900, three communication devices 910 and a sensor device 920. The three communication devices 910 and the sensor device 920 are located inside an area 902 where communication with the base station 900 is possible. The base station 900 is connected to an information processing device 10 through a network 12, which is a fixed network.

The information processing device 10 provides the first communication service to the communication devices located in the nearby vicinity of the base station 900 by using the base station 900 connected through the network 12. The first communication service may be a digital TV broadcast service, for example, or another kind of communication service.

The base station 900 provides the above-described first communication service to the devices located inside the area 902. Further, the base station 900 coordinates secondary usage of a part (or whole) of spectrum which is not used in the spectrum assigned to the first communication service.

To be more specific, as shown in FIG. 15, the base station 900 operates as the secondary communication authentication node (FC1), the determination node (FC4) and the sensor node (FC6) described above. Specifically, the base station 900 communicates with the communication devices 910 located in the nearby vicinity of the station, for example, senses a communication environment and generates sensed data. Further, the base station 900 acquires sensed data from the sensor device 920, for example, integrates the acquired sensed data with the sensed data sensed by itself and then determines whether secondary usage of a spectrum is available according to the spectrum policy. If the base station 900 determines that secondary usage is available based on the sensed data, it starts a communication service related to secondary usage, which is, the second communication service.

In this case, the base station 900 which is connected to the fixed network 12 can operate as the above-described permanent secondary communication authentication node by meeting a predetermined criterion set by statute or the like. Alternatively, the base station 900 may be the above-described temporary secondary communication authentication node that receives authority for permitting start of the second communication service from the information processing device 10.

Meanwhile, the communication devices 910 operate as the communication node (FC7) described above. Specifically, the communication devices 910 transmit and receive radio signals to and from the base station 900. The base station 900 can thereby sense the communication environment in the area 902.

The sensor device 920 operates as the sensor node (FC6) described above. Specifically, the sensor device 920 senses the communication environment surrounding its own device and generates sensed data. The sensor device 920 then transmits the generated sensed data to the base station 900. Note that the sensor device 920 may be omitted in the communication system 9.

In such a configuration of the communication system 9, it is possible to provide the second communication service to the communication devices 910 and the sensor device 920 by using an unused part (or whole) of the spectrum assigned to the first communication service.

However, because the base station 900 performs sensing of a communication environment, acquisition of sensed data, determination of the availability of secondary usage and start of secondary usage in this case, there is a concern that the processing load is concentrated on the base station 900. Further, because the base station 900 is not a mobile terminal, it is difficult to flexibly decide or extend the range of secondary usage of a spectrum according to the communication environment. In view of this, it is preferred to employ any one of system configurations according to first to fifth embodiments of the present invention which are described hereinbelow.

[3-2. First Embodiment]

Figure 2:
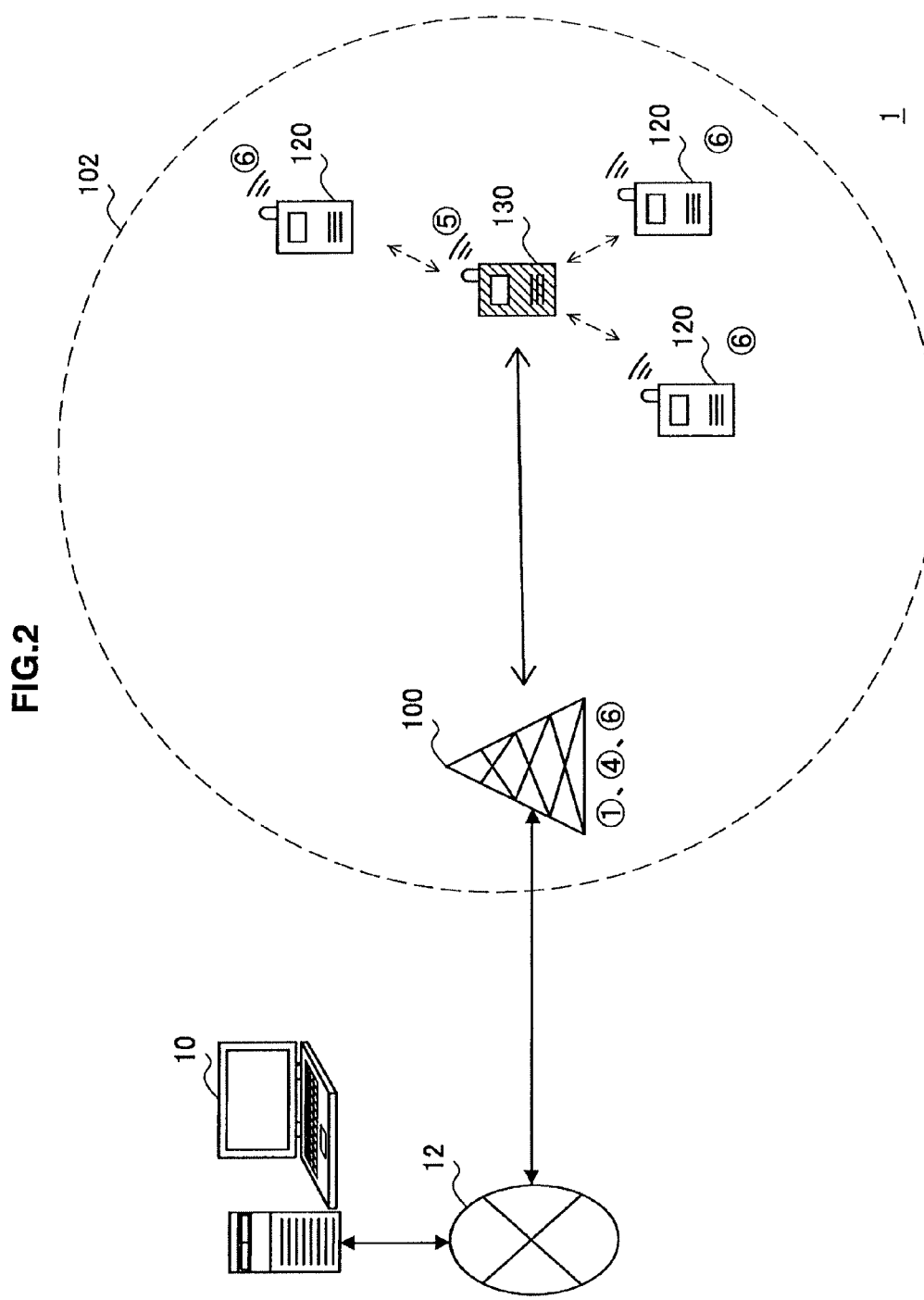
FIG. 2 is a schematic view showing a configuration of a communication system according to a first embodiment.
Figure 3:
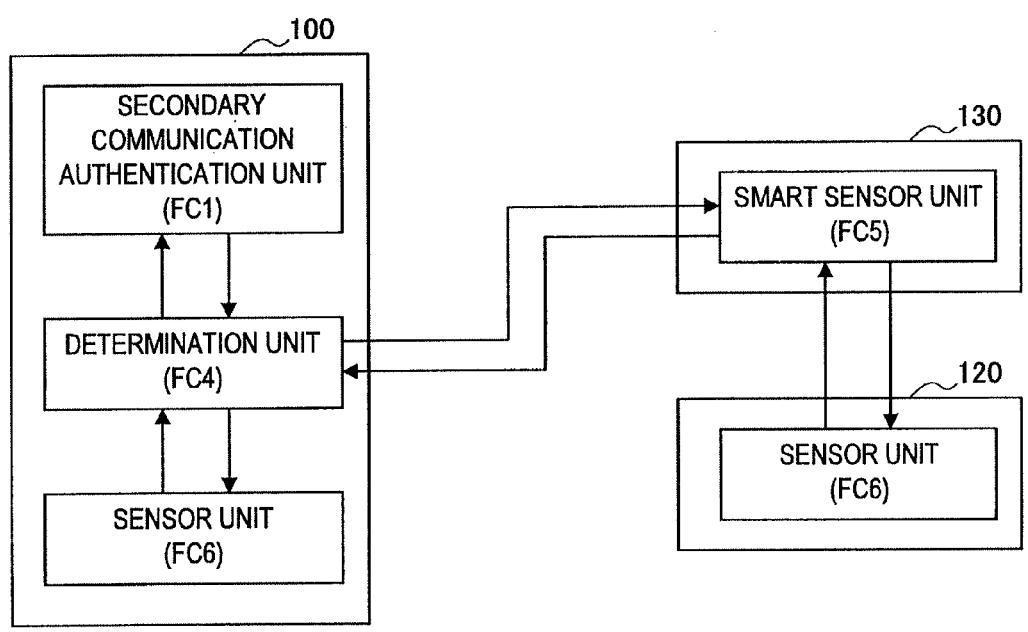
FIG. 3 is a block diagram showing an example of a functional layout in the communication system of FIG. 2.

FIG. 2 is a schematic view showing an example of a configuration of a communication system 1 according to a first embodiment of the present invention. FIG. 3 is a block diagram showing an example of a functional layout among devices in the communication system 1 shown in FIG. 2.

Referring to FIG. 2, the communication system 1 includes a base station 100, three sensor devices 120 and a smart sensor device 130. The three sensor devices 120 and the smart sensor device 130 are located inside an area 102 where communication with the base station 100 is possible. The base station 100 is connected to an information processing device 10 through a network 12, which is a fixed network.

The base station 100 can provide the first communication service to the devices located inside the area 102. Further, the base station 100 coordinates secondary usage of an unused part (or whole) of the spectrum assigned to the first communication service.

To be more specific, as shown in FIG. 3, the base station 100 operates as the secondary communication authentication node (FC1), the determination node (FC4) and the sensor node (FC6) described above. Specifically, the base station 100 acquires sensed data from the smart sensor device 130 located in the nearby vicinity of the station, for example. Further, the base station 100 may communicate with the sensor devices 120 located in the nearby vicinity of the station, for example, additionally sense the communication environment by itself to generate sensed data. Then, the base station 100 integrates the sensed data acquired from the smart sensor device 130 and the sensed data sensed by itself (the data, however, is not necessarily integrated), for example, and determines whether secondary usage of a spectrum is available according to the spectrum policy. If the base station 100 determines that secondary usage is available based on the sensed data, it starts the second communication service.

The sensor devices 120 operate as the sensor node (FC6) described above. Specifically, in response to an instruction from the smart sensor device 130, for example, the sensor devices 120 generate sensed data by sensing the communication environment surrounding their own devices. The sensor devices 120 then transmit the generated sensed data to the smart sensor device 130.

The smart sensor device 130 operates as the smart sensor node (FC5) described above. Specifically, the smart sensor device 130 gives an instruction for sensing of a communication environment to the sensor devices 120 in the vicinity of its own device and acquires sensed data from the sensor devices 120. Further, the smart sensor device 130 may add sensed data obtained by sensing the surrounding communication environment of its own to the acquired data. At this time, the smart sensor device 130 may integrate a plurality of sensed data to generate one sensed data. The smart sensor device 130 then transmits the sensed data to the base station 100.

In such a configuration of the communication system 1, it is possible to provide the second communication service to the sensor devices 120 and the smart sensor device 130 by using an unused part (or whole) of the spectrum assigned to the first communication service. Further, because the smart sensor device 130, rather than the base station 100, acquires at least part of the sensed data, the load is not concentrated on the base station 100, so that the second communication service can be started promptly.

[3-3. First Embodiment (Alternative Example)]

Figure 4:
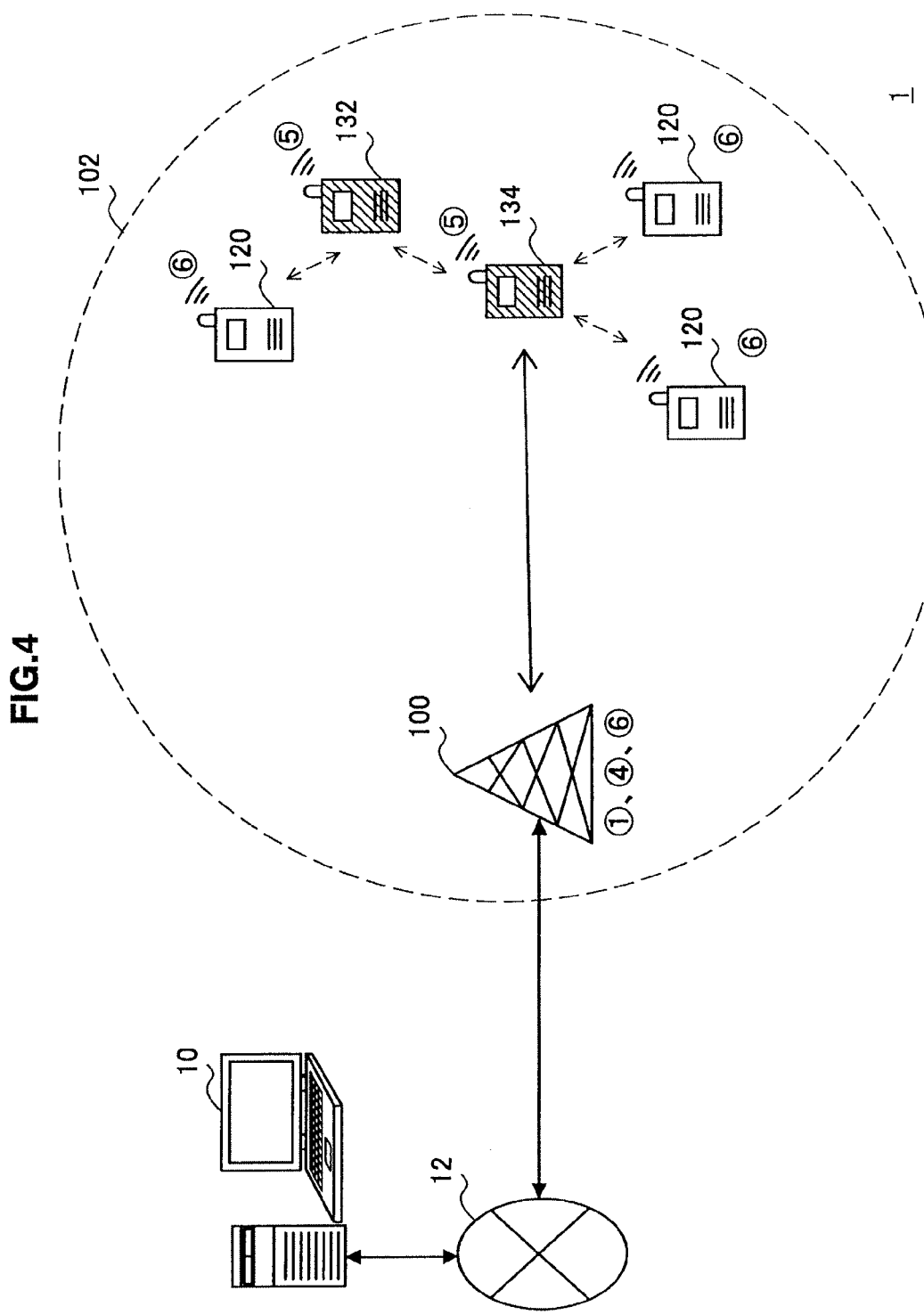
FIG. 4 is a schematic view showing a configuration of a communication system according to an alternative example of the first embodiment.
Figure 5:
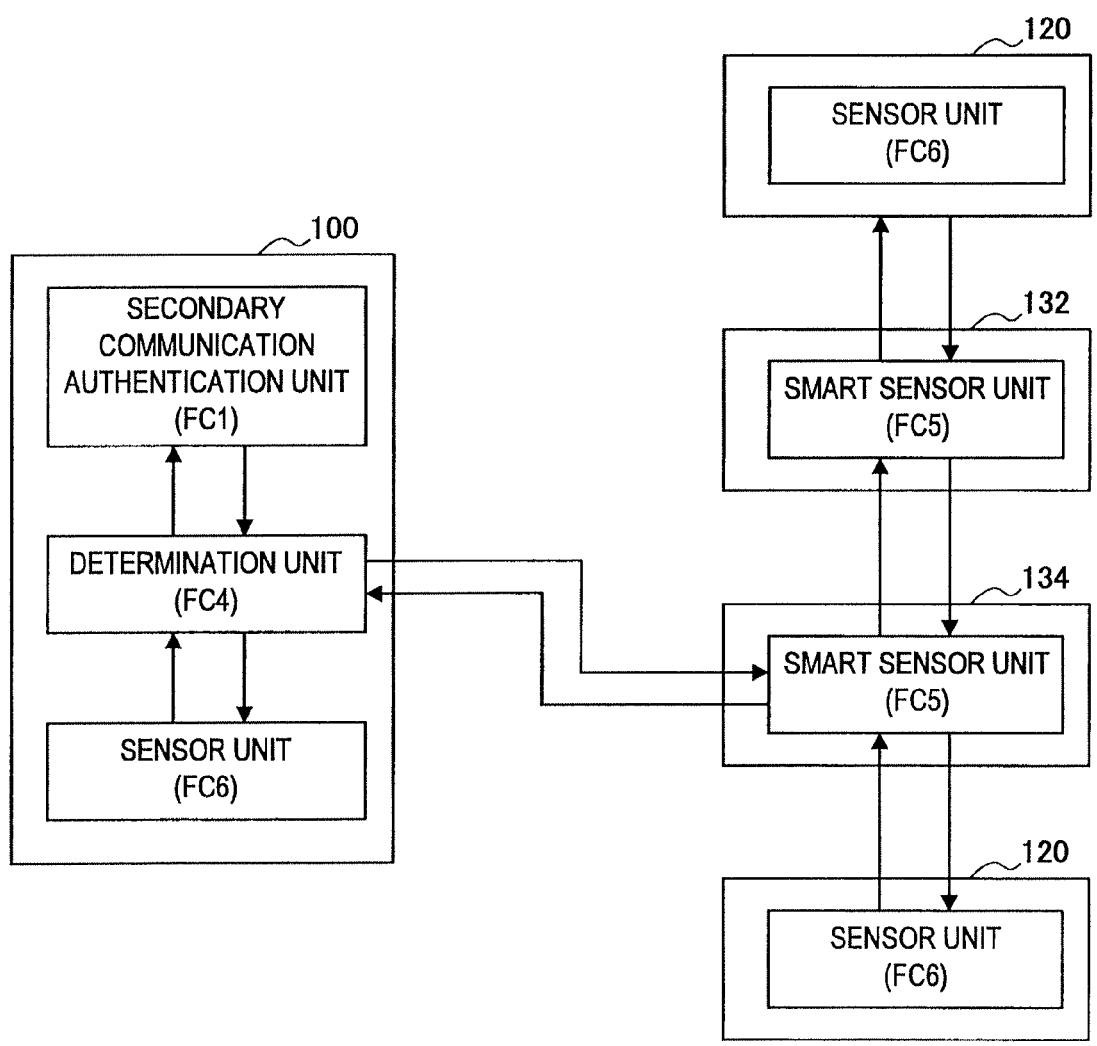
FIG. 5 is a block diagram showing an example of a functional layout in the communication system of FIG. 4.

FIG. 4 is a schematic view showing an alternative example of the communication system 1 according to the first embodiment shown in FIG. 2. FIG. 5 is a block diagram showing an example of a functional layout among devices in the alternative example of the communication system 1 shown in FIG. 4.

Referring to FIG. 4, smart sensor devices 132 and 134 are included instead of the smart sensor device 130 in the communication system 1 shown in FIG. 2.

In this alternative example, the smart sensor devices 132 and 134 operate as the smart sensor node (FC5) described above. The smart sensor device 132 acquires sensed data from the sensor devices 120 located in the nearby vicinity of its own device, integrates the acquired sensed data with sensed data sensed by itself, for example, and then transmits the data to the smart sensor device 134.

On the other hand, the smart sensor device 134 acquires the sensed data from the sensor devices 120 located in the nearby vicinity of its own device and the smart sensor device 132, integrates the acquired sensed data with sensed data sensed by itself, for example, and then transmits the integrated sensed data to the base station 100. Which of the smart sensor devices 132 and 134 transmits the sensed data to the base station 100 as a representative is decided by identifying a device from which access to the base station 100 is easier in consideration of their communication environment, for example.

In such a configuration of the communication system 1, acquisition of the sensed data over a wider range is performed by the smart sensor devices 132 and 134 in collaboration with each other, instead of the base station 100. It is thereby possible to make determination about the availability of secondary usage of a spectrum based on a larger amount of information.

[3-4. Second Embodiment]

Figure 6:
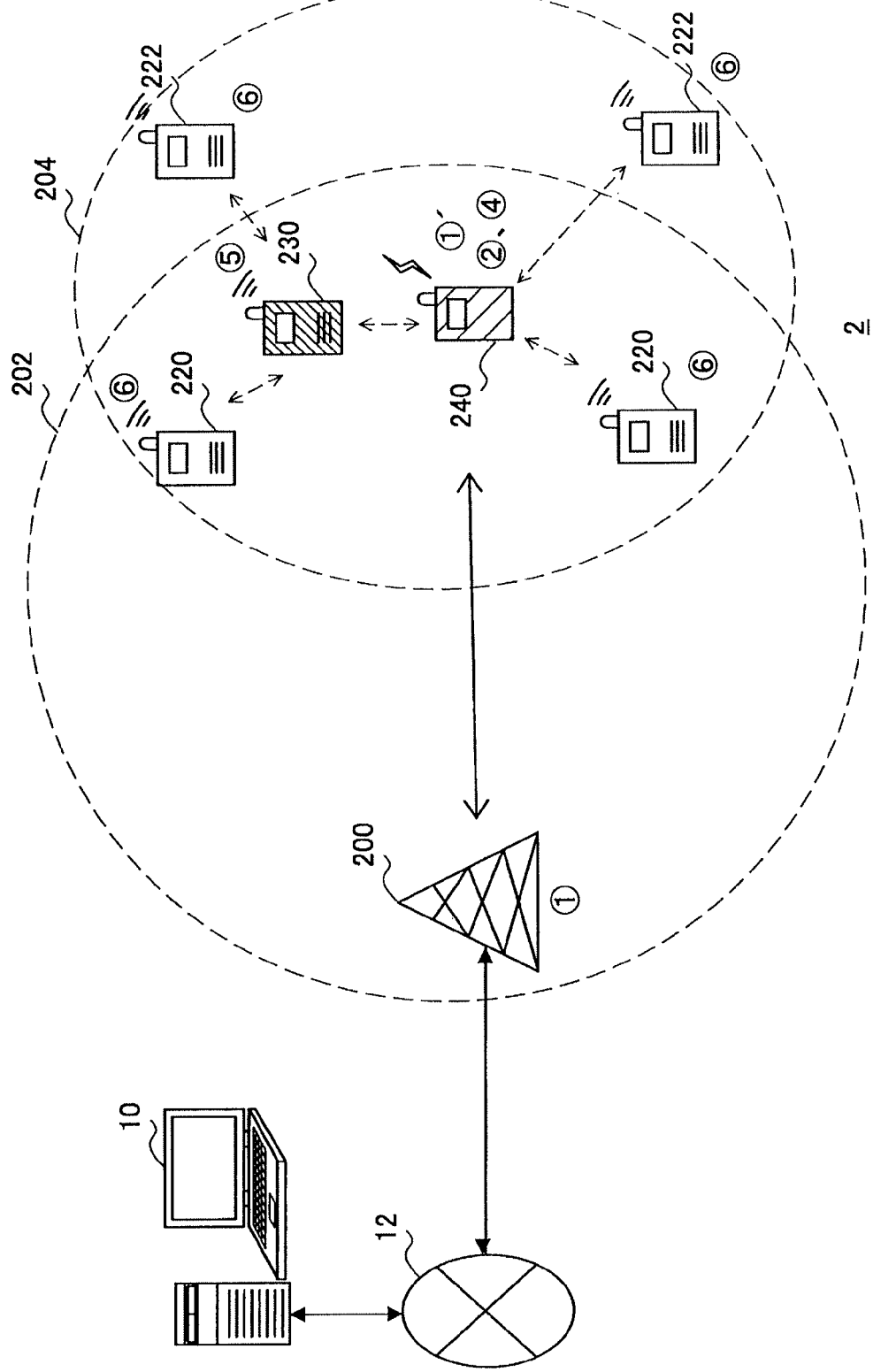
FIG. 6 is a schematic view showing a configuration of a communication system according to a second embodiment.
Figure 7:
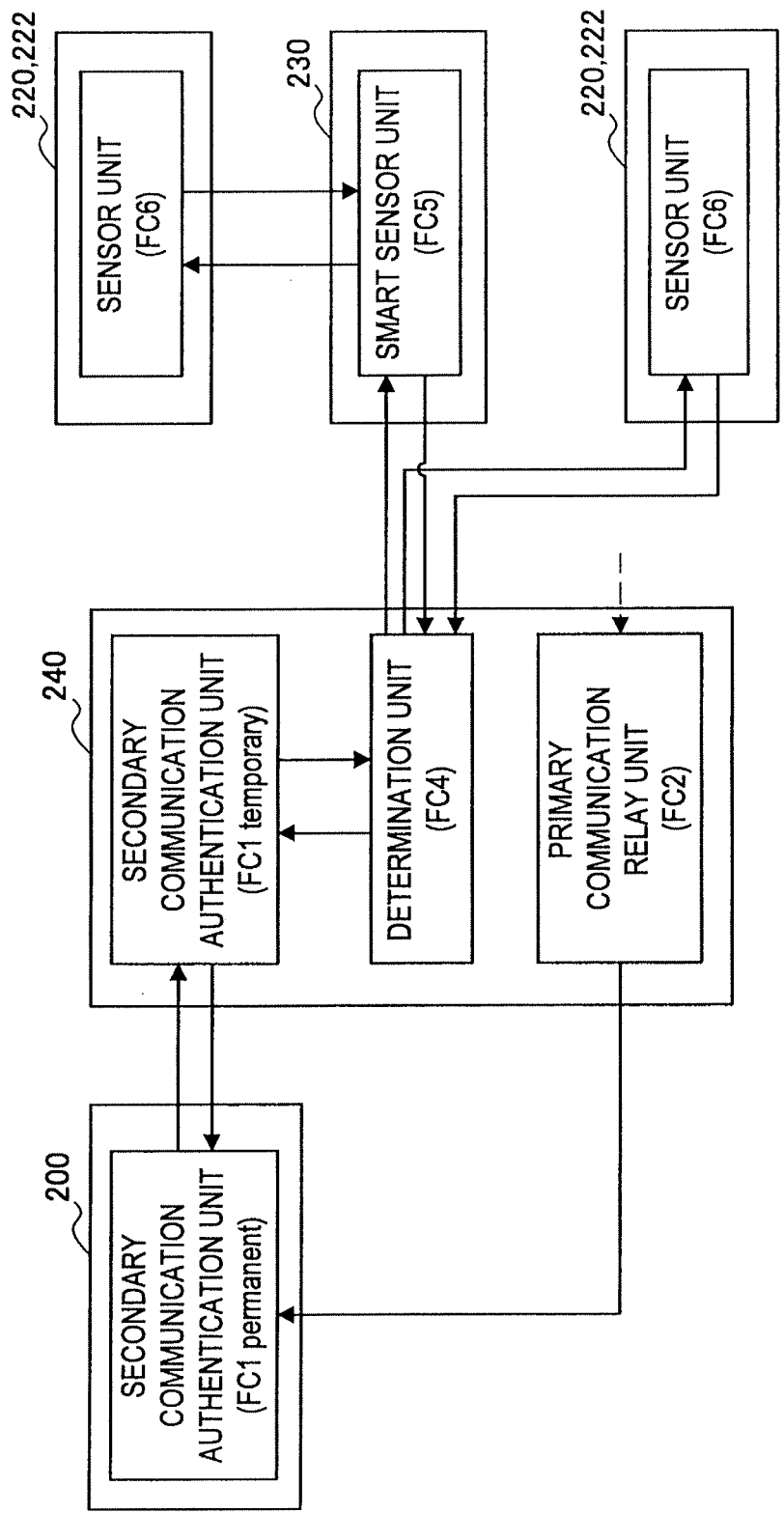
FIG. 7 is a block diagram showing an example of a functional layout in the communication system of FIG. 6.

FIG. 6 is a schematic view showing an example of a configuration of a communication system 2 according to a second embodiment of the present invention. FIG. 7 is a block diagram showing an example of a functional layout among devices in the communication system 2 shown in FIG. 6.

Referring to FIG. 6, the communication system 2 includes a base station 200, two sensor devices 220, two sensor devices 222, a smart sensor device 230, and a determination device 240. The two sensor devices 220, the smart sensor device 230 and the determination device 240 are located inside an area 202 where communication with the base station 200 is possible. The base station 200 is connected to an information processing device 10 through a network 12, which is a fixed network.

The base station 200 can provide the first communication service to the devices located inside the area 202. Further, the base station 200 (or the information processing device 10) can temporarily grant authority for permitting secondary usage of an unused part (or whole) of the spectrum assigned to the first communication service to the determination device 240, which is described later, according to the communication environment. Thus, the base station 200 operates as the permanent secondary communication authentication node (FC1) described above. Instead of that the base station 200 is the secondary communication authentication node, another node in the network 12 may be the secondary communication authentication node, and the base station 200 may mediate grant of authority from the node to the determination device 240.

The sensor devices 220 operate as the sensor node (FC6) described above. Specifically, the sensor devices 220 generate sensed data by sensing the communication environment surrounding their own devices. The sensor devices 220 then transmit the generated sensed data to the smart sensor device 230 or the determination device 240. The sensor devices 222 also operate as the sensor node (FC6) described above. Specifically, in response to an instruction from the smart sensor device 230 or the determination device 240, the sensor devices 222 generate sensed data by sensing the communication environment surrounding their own devices and then transmit the generated sensed data to the smart sensor device 230 or the determination device 240.

The smart sensor device 230 operates as the smart sensor node (FC5) described above. Specifically, in response to an instruction from the determination device 240, the smart sensor device 230 acquires the sensed data from the sensor devices 220 and 222 located in the nearby vicinity of its own device. Further, the smart sensor device 230 adds sensed data obtained by sensing the communication environment surrounding its own device to the acquired data. The smart sensor device 230 then transmits the sensed data to the determination device 240.

The determination device 240 operates as the primary communication relay node (FC2) and the determination node (FC4) described above. Further, the determination device 240 can operate as the temporary secondary communication authentication node (FC1) described above. Specifically, the determination device 240 acquires the sensed data from the sensor devices 220 and 222 and the smart sensor device 230 located in the nearby vicinity of its own device. Then, based on the acquired sensed data, the determination device 240 determines whether provision of the second communication service is available using a spectrum which is not actually used in the spectrum assigned to the first communication service. If the determination device 240 determines from the sensed data that provision of the second communication service is available, the determination device 240 requests the base station 200 for temporary grant of authority for permitting start of the second communication service. At this time, the determination device 240 transmits the acquired sensed data, additionally obtained location data of its own device or the like to the base station 200. If the authority is granted in accordance with the transmitted data, the determination device 240 starts the second communication service with a communication device located in the nearby vicinity (e.g. an area 204) of its own device.

Further, the determination device 240 operates as the primary communication relay node and thus serves as a pseudo base station or access point for the first communication service, and it can relay a communication packet corresponding to the first communication service which is transmitted from the sensor device 222, for example, to the base station 200.

As shown in FIG. 6, the two sensor devices 222 are located outside the area 202 where radio signals can be transmitted to and received from the base station 200. Because the two sensor devices 222 are located in the positions where communication with the base station 200 is impossible, it is difficult for the base station 200 to provide the second communication service related to secondary usage to the two sensor devices 222. However, in the configuration of the communication system 2 according to this embodiment, the determination device 240 operates as the determination node, so that it is possible to flexibly start secondary usage of a spectrum by targeting communication devices located inside the area 204.

In the first and second embodiments described in the foregoing, a device connected to the fixed network 12 has the authority to grant permission for starting secondary usage of a spectrum that is used for the first communication service. On the other hand, in third and fourth embodiments described in the following, a communication device which is a previously authorized mobile terminal permits start of secondary usage of a spectrum.

[3-5. Third Embodiment]

Figure 8:
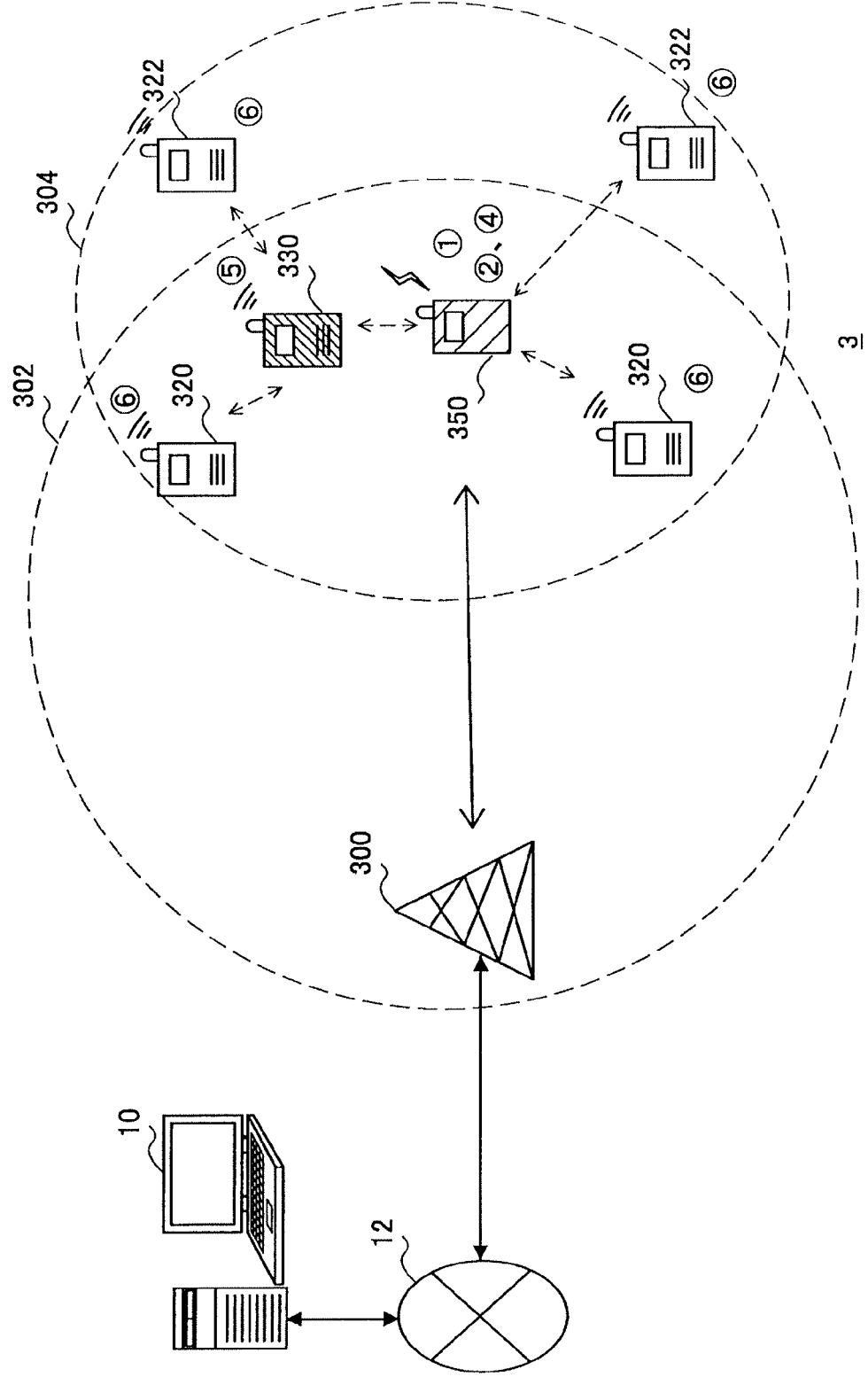
FIG. 8 is a schematic view showing a configuration of a communication system according to a third embodiment.
Figure 9:
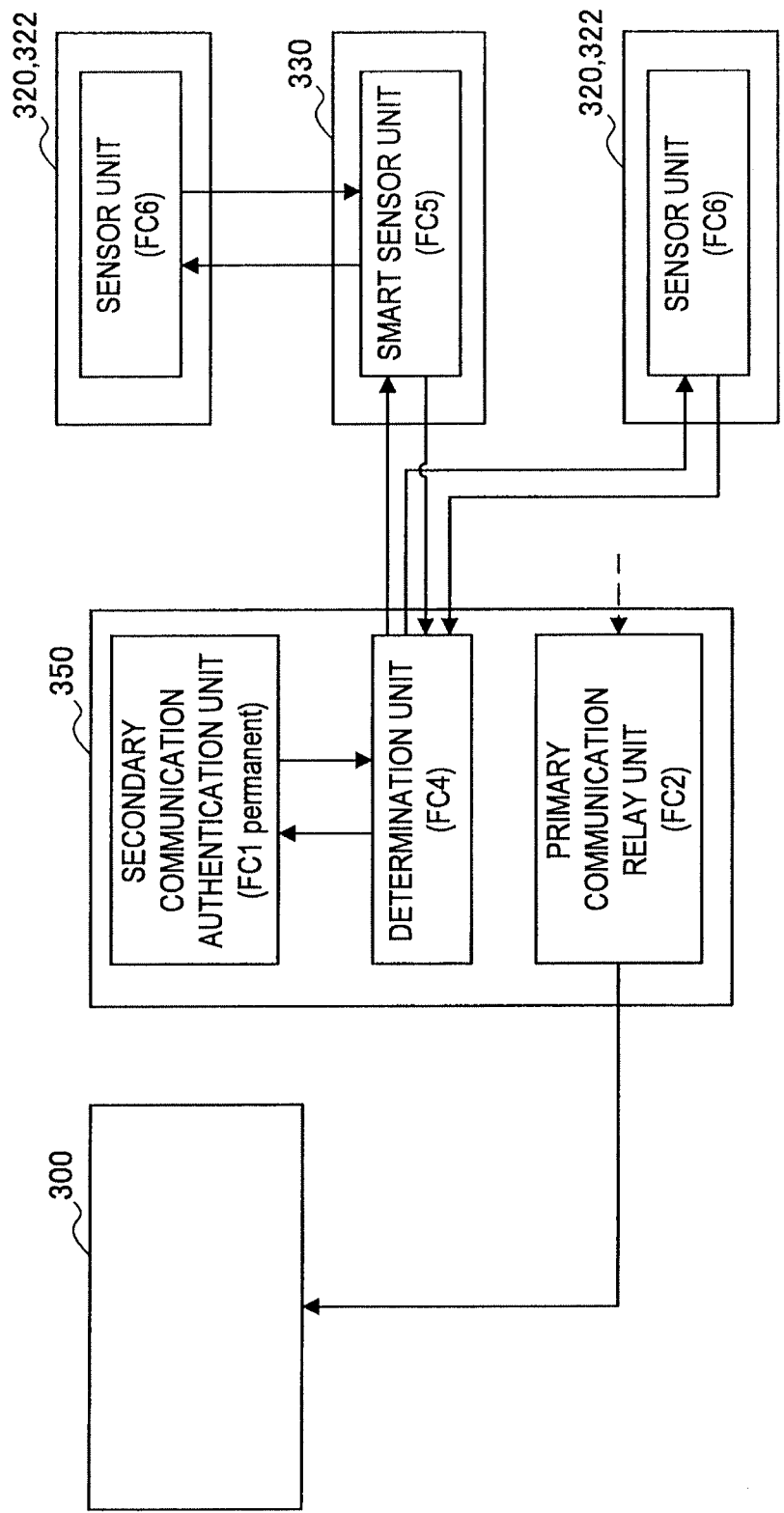
FIG. 9 is a block diagram showing an example of a functional layout in the communication system of FIG. 8.

FIG. 8 is a schematic view showing an example of a configuration of a communication system 3 according to a third embodiment of the present invention. FIG. 9 is a block diagram showing an example of a functional layout among devices in the communication system 3 shown in FIG. 8.

Referring to FIG. 8, the communication system 3 includes a base station 300, two sensor devices 320, two sensor devices 322, a smart sensor device 330, and a determination device 350. The two sensor devices 320, the smart sensor device 330 and the determination device 350 are located inside an area 302 where communication with the base station 300 is possible. The base station 300 is connected to an information processing device 10 through a network 12, which is a fixed network.

The base station 300 can provide the first communication service to the devices located inside the area 302.

On the other hand, the sensor devices 320 and the sensor devices 322 operate as the sensor node (FC6) described above as shown in FIG. 9. Specifically, the sensor devices 320 generate sensed data by sensing the communication environment surrounding their own devices and then transmit the generated sensed data to the smart sensor device 330 or the determination device 350. Likewise, the sensor devices 322 generate sensed data by sensing the communication environment surrounding their own devices and then transmit the generated sensed data to the smart sensor device 330 or the determination device 350.

The smart sensor device 330 operates as the smart sensor node (FC5) described above. Specifically, in response to an instruction from the determination device 350, the smart sensor device 330 acquires the sensed data from the sensor devices 320 and 322 located in the nearby vicinity of its own device. Further, the smart sensor device 330 adds sensed data obtained by sensing the communication environment surrounding its own device to the acquired data. The smart sensor device 330 then transmits the sensed data to the determination device 350.

The determination device 350 operates as the permanent secondary communication authentication node (FC1), the primary communication relay node (FC2) and the determination node (FC4) described above. Specifically, the determination device 350 acquires the sensed data from the sensor devices 320 and 322 and the smart sensor device 330 located in the nearby vicinity of its own device. Then, based on the acquired sensed data, the determination device 350 determines whether provision of the second communication service is available using a spectrum which is not actually used in the spectrum assigned to the first communication service. If the determination device 350 determines from the sensed data that provision of the second communication service is available, the determination device 350 starts the second communication service with a communication device located in the nearby vicinity (e.g. an area 304) of its own device.

Further, the determination device 350 operates as the primary communication relay node and thus serves as a pseudo base station or access point for the first communication service, and it can relay a communication packet corresponding to the first communication service which is transmitted from the sensor device 322, for example, to the base station 300. In this embodiment, however, the determination device 350 may not necessarily operate as the primary communication relay node.

In such a configuration of the communication system 3, it is possible to provide the second communication service by using an unused part (or whole) of the spectrum assigned to the first communication service. Because the determination device 350 that meets a predetermined criterion set by statute or the like and is thus authorized to coordinate the second communication service decides the start of secondary usage, it is possible to promptly start provision of the second communication service. Further, when the determination device 350 is a mobile terminal, it is possible to flexibly set the range of the second communication network according to the location of the determination device 350. In this embodiment, the determination device 350, which is the permanent secondary communication authentication node, is not necessarily located inside the communication area 302 where the first communication service is provided.

[3-6. Fourth Embodiment]

Figure 10:
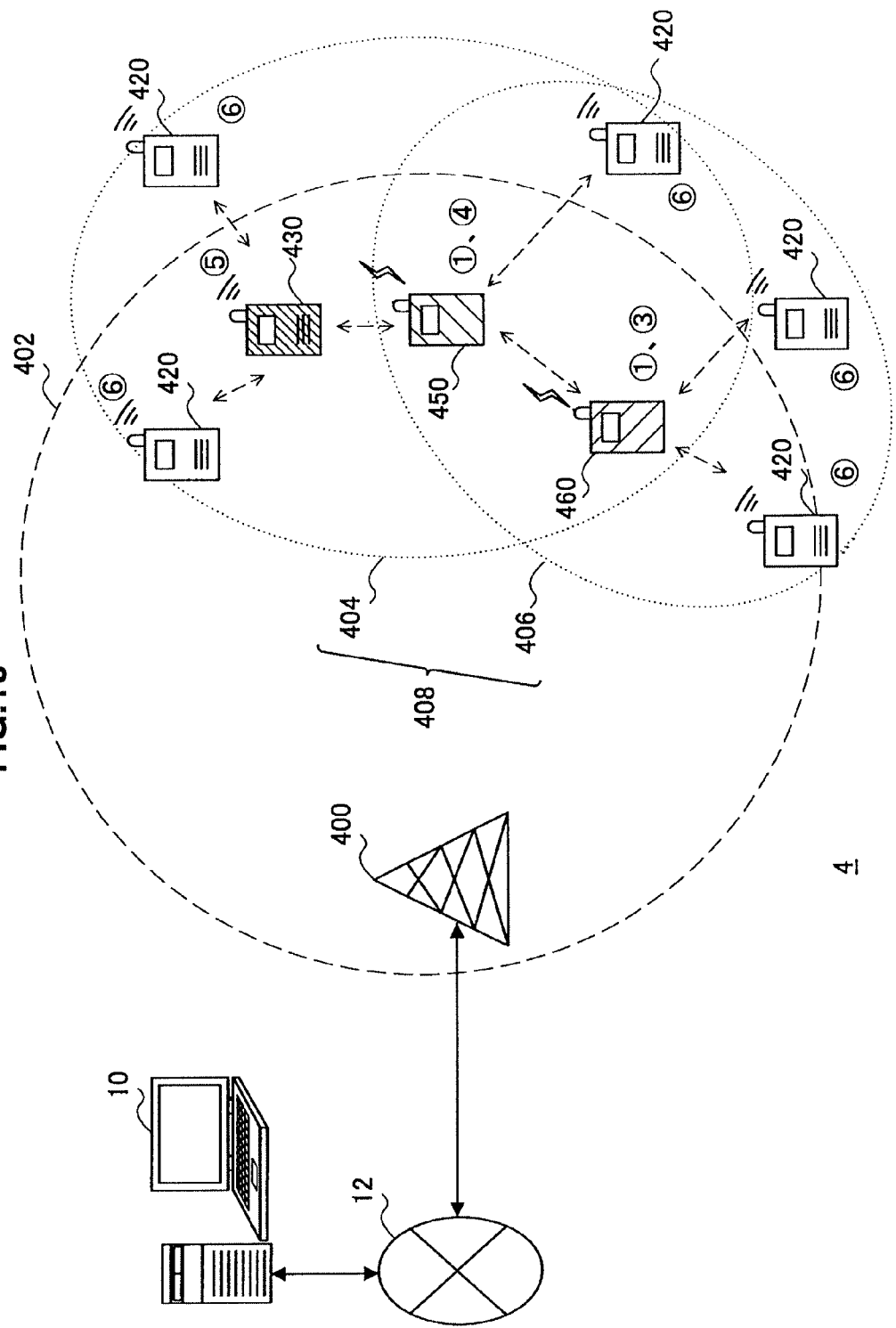
FIG. 10 is a schematic view showing a configuration of a communication system according to a fourth embodiment.
Figure 11:
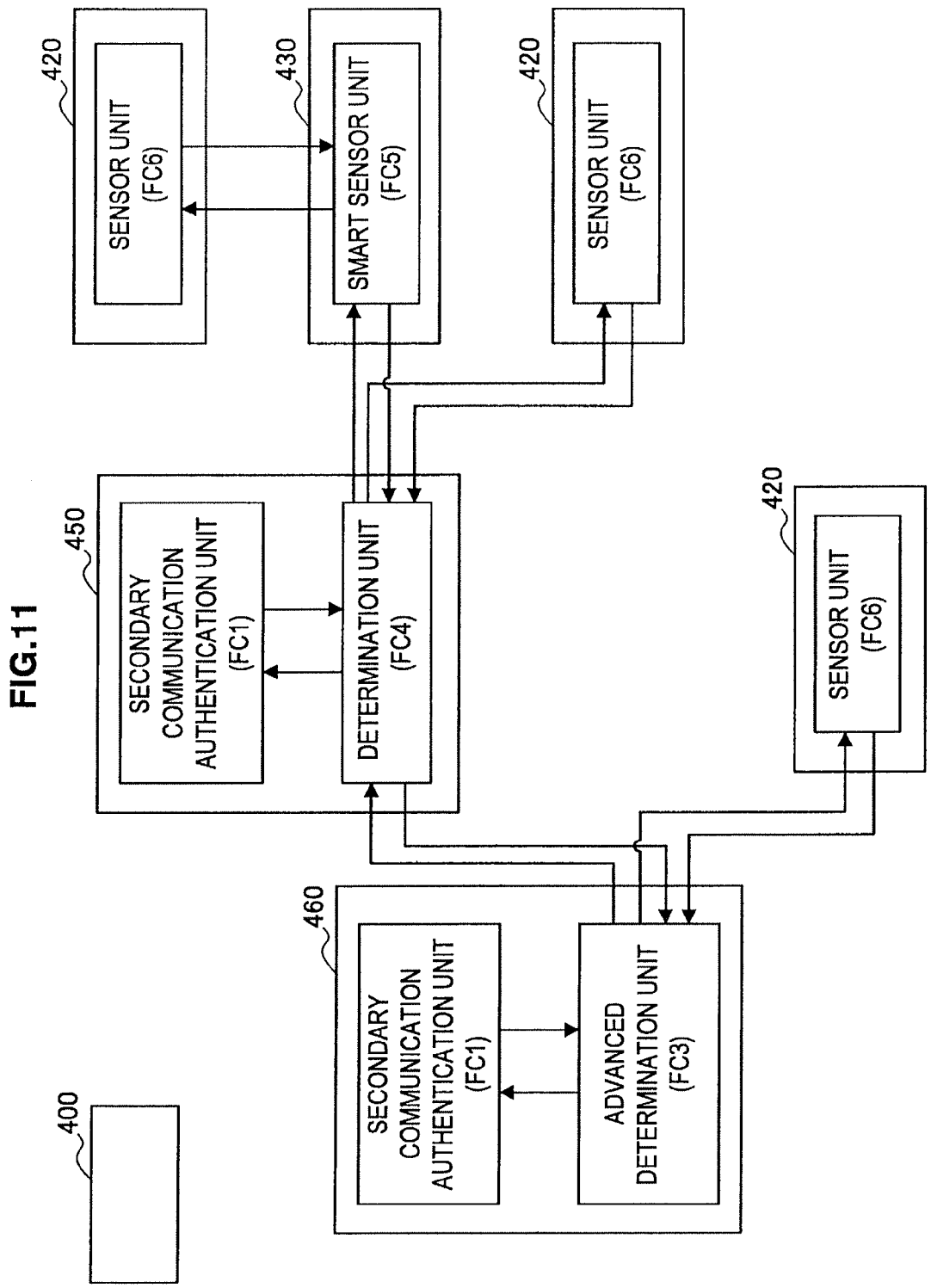
FIG. 11 is a block diagram showing an example of a functional layout in the communication system of FIG. 10.

FIG. 10 is a schematic view showing an example of a configuration of a communication system 4 according to a fourth embodiment of the present invention. FIG. 11 is a block diagram showing an example of a functional layout among devices in the communication system 4 shown in FIG. 10.

Referring to FIG. 10, the communication system 4 includes a base station 400, five sensor devices 420, a smart sensor device 430, a determination device 450 and an advanced determination device 460. The base station 400 is connected to an information processing device 10 through a network 12, which is a fixed network.

The base station 400 can provide the first communication service to the devices located inside an area 402.

On the other hand, the sensor devices 420 operate as the sensor node (FC6) described above as shown in FIG. 11. Specifically, the sensor devices 420 generate sensed data by sensing the communication environment surrounding their own devices and then transmit the generated sensed data to the smart sensor device 430, the determination device 450 or the advanced determination device 460.

The smart sensor device 430 operates as the smart sensor node (FC5) described above. Specifically, in response to an instruction from the determination device 450, the smart sensor device 430 acquires the sensed data from the sensor devices 420 located in the nearby vicinity of its own device. Further, the smart sensor device 430 adds sensed data obtained by sensing the communication environment surrounding its own device to the acquired data. The smart sensor device 430 then transmits the sensed data to the determination device 450.

The determination device 450 operates as the permanent secondary communication authentication node (FC1) and the determination node (FC4) described above. Specifically, the determination device 450 acquires the sensed data from the sensor devices 420 and the smart sensor device 430 located in the nearby vicinity of its own device. Then, the determination device 450 determines the availability of secondary usage of a spectrum based on the acquired sensed data. If the determination device 450 determines that start of provision of the second communication service is practicable, the determination device 450 starts provision of the second communication service to a communication device located in the nearby vicinity (e.g. an area 404) of its own device. Further, in response to a request from the advanced determination device 460, the determination device 450 creates a secondary communication profile containing the acquired sensed data, link data calculated from the sensed data, the spectrum policy or the like and transmits the profile to the advanced determination device 460. The transmitted secondary communication profile is used for determination about the availability of extension of the second communication network by the advanced determination device 460, which is described later.

The advanced determination device 460 operates as the permanent secondary communication authentication node (FC1) and the advanced determination node (FC3) described above. Specifically, the advanced determination device 460 first gives instruction for transmission of the secondary communication profile to the determination device 450. The advanced determination device 460 then determines whether extension of the second communication network is available based on the secondary communication profile received from the determination device 450. If the advanced determination device 460 determines that extension of the second communication network is available, it starts provision of the second communication service with the extended network range to communication devices located in the nearby vicinity of its own device and the determination device 450.

In such a configuration of the communication system 4, it is possible to provide the second communication service in an area 408 including areas 404 and 406 by using an unused part (or whole) of the spectrum assigned to the first communication service. Because the second communication service is provided by the advanced determination device 460 and the determination device 450 in collaboration, the service area of the second communication service is extended. Note that, in this embodiment, the determination device 450 may be located outside the area 402 where the first communication service is provided.

[3-7. Fifth Embodiment]

Figure 12:
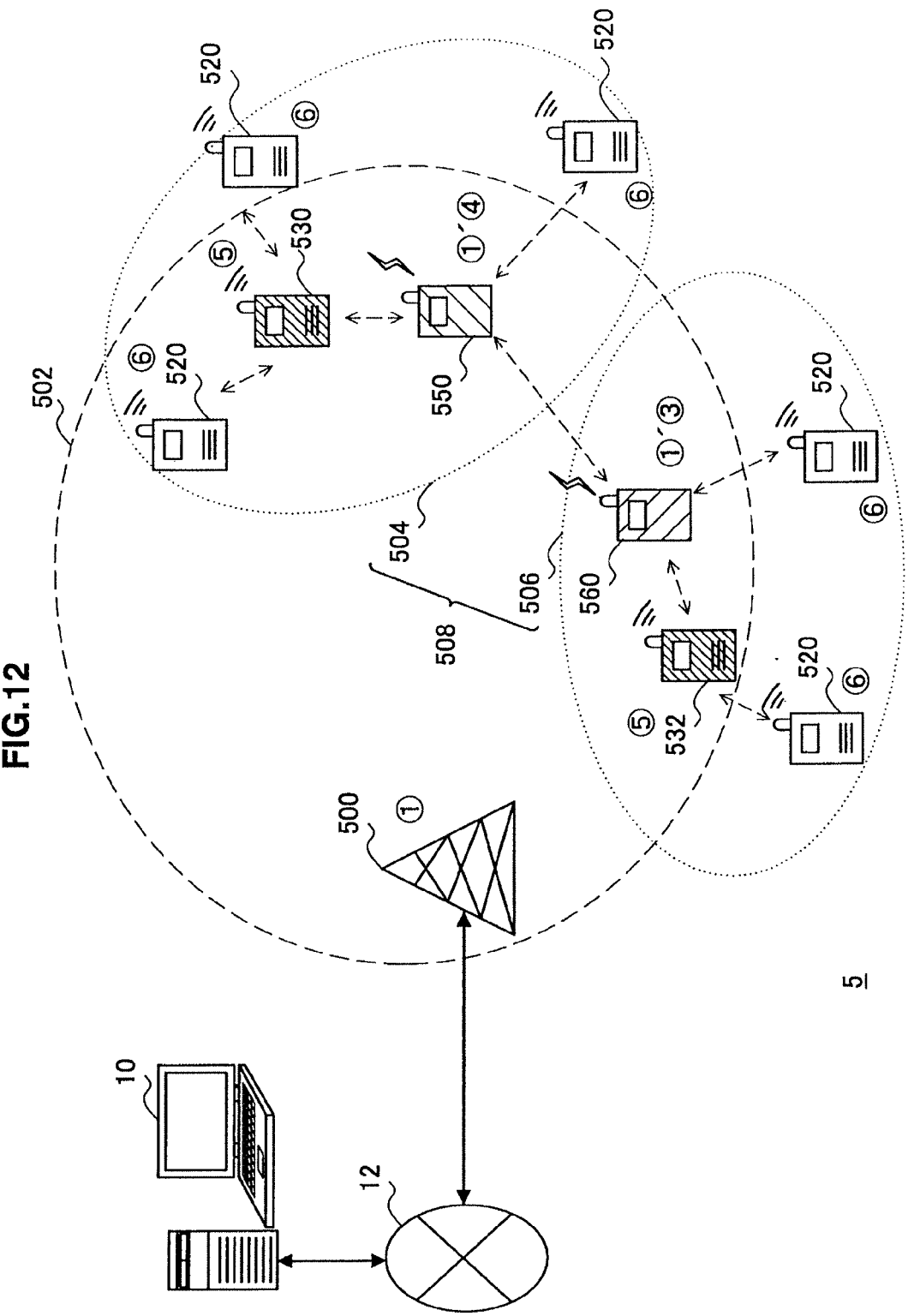
FIG. 12 is a schematic view showing a configuration of a communication system according to a fifth embodiment.
Figure 13:
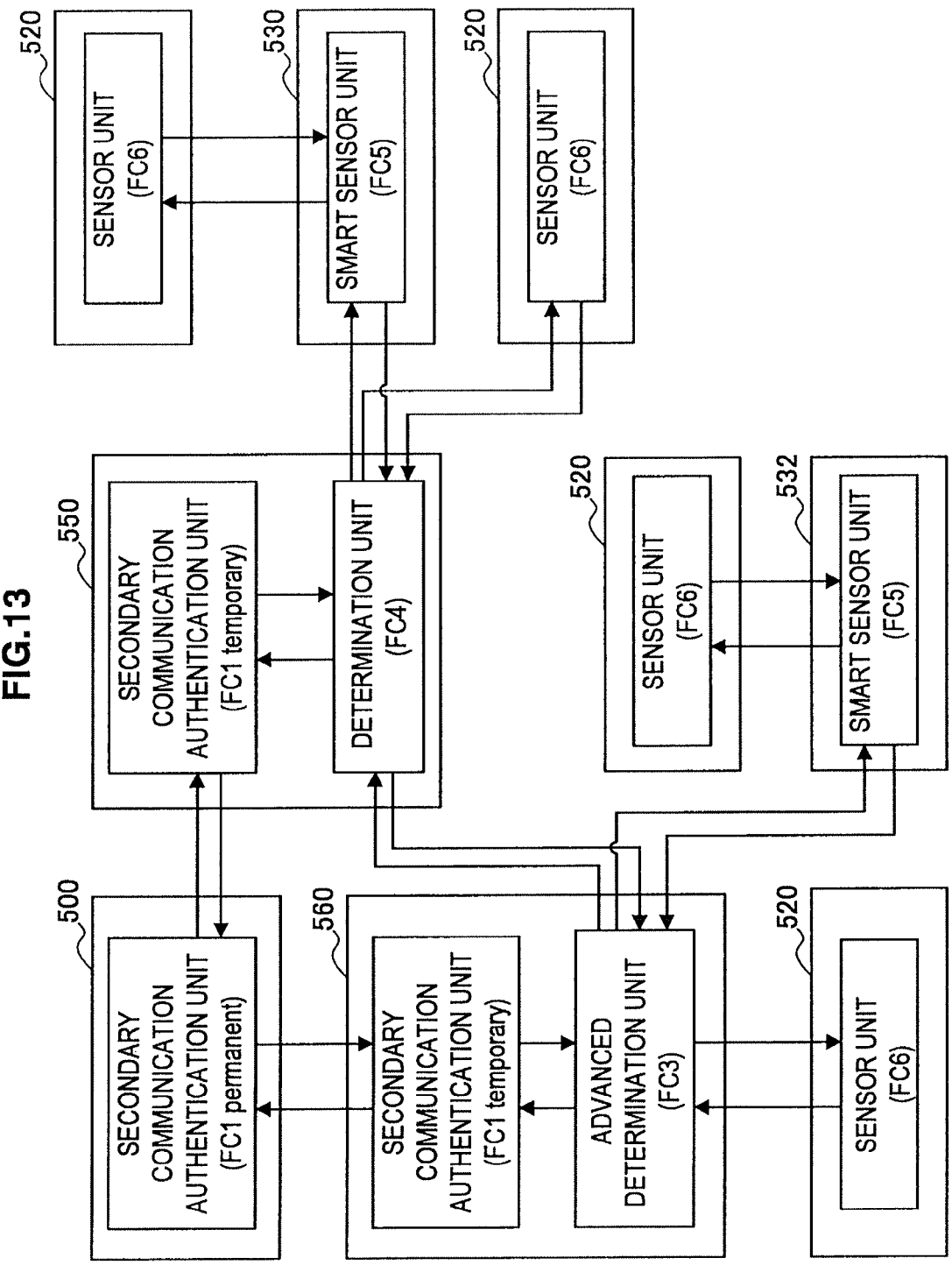
FIG. 13 is a block diagram showing an example of a functional layout in the communication system of FIG. 12.

FIG. 12 is a schematic view showing an example of a configuration of a communication system 5 according to a fifth embodiment of the present invention. FIG. 13 is a block diagram showing an example of a functional layout among devices in the communication system 5 shown in FIG. 12.

Referring to FIG. 12, the communication system 5 includes a base station 500, five sensor devices 520, smart sensor devices 530 and 532, a determination device 550 and an advanced determination device 560. The base station 500 is connected to an information processing device 10 through a network 12, which is a fixed network.

The base station 500 can provide the first communication service to the devices located inside an area 502. Further, the base station 500 can temporarily grant authority for permitting secondary usage of an unused part (or whole) of the spectrum assigned to the first communication service to the determination device 550 and the advanced determination device 560, which are described later, according to the communication environment. Thus, the base station 500 operates as the permanent secondary communication authentication node (FC1) described above.

On the other hand, the sensor devices 520 operate as the sensor node (FC6) described above as shown in FIG. 13. Specifically, the sensor devices 520 generate sensed data by sensing the communication environment surrounding their own devices and then transmit the generated sensed data to the smart sensor device 530 or 532, the determination device 550 or the advanced determination device 560.

The smart sensor devices 530 and 532 operate as the smart sensor node (FC5) described above. Specifically, in response to an instruction from the determination device 550, the smart sensor device 530 acquires the sensed data from the sensor devices 520 located in the nearby vicinity of its own device. Further, the smart sensor device 530 adds sensed data obtained by sensing the communication environment surrounding its own device to the acquired data. The smart sensor device 530 then transmits the sensed data to the determination device 550. Likewise, in response to an instruction from the advanced determination device 560, the smart sensor device 532 acquires the sensed data from the sensor devices 520 located in the nearby vicinity of its own device. Further, the smart sensor device 532 adds sensed data obtained by sensing the communication environment surrounding its own device to the acquired data. The smart sensor device 532 then transmits the sensed data to the advanced determination device 560.

The determination device 550 operates as the determination node (FC4) described above. Further, the determination device 550 can operate as the temporary secondary communication authentication node (FC1) described above. Specifically, the determination device 550 acquires the sensed data from the sensor devices 520 and the smart sensor device 530 located in the nearby vicinity of its own device. Then, the determination device 550 determines the availability of secondary usage of a spectrum based on the acquired sensed data. If the determination device 550 determines that start of provision of the second communication service is practicable, the determination device 550 requests the base station 500 for temporary grant of authority for permitting start of the second communication service. At this time, the determination device 550 transmits the acquired sensed data, additionally obtained location data of its own device or the like to the base station 500. If the authority is granted in accordance with the transmitted data, the determination device 550 starts provision of the second communication service to a communication device located in the nearby vicinity (e.g. an area 504) of its own device. Further, in response to a request from the advanced determination device 560, the determination device 550 creates a secondary communication profile containing the acquired sensed data, link data calculated from the sensed data, the spectrum policy or the like and transmits the profile to the advanced determination device 560. The transmitted secondary communication profile is used for determination about the availability of extension of the second communication network by the advanced determination device 560, which is described later.

The advanced determination device 560 operates as the advanced determination node (FC3) described above. Further, the advanced determination device 560 can operate as the temporary secondary communication authentication node (FC1) described above. Specifically, the advanced determination device 560 first gives instruction for transmission of the secondary communication profile to the determination device 550. The advanced determination device 560 then acquires the sensed data from the sensor devices 520 and the smart sensor device 532 located in the nearby vicinity of its own device. Then, the advanced determination device 560 determines whether extension of the second communication network is available based on the secondary communication profile received from the determination device 550 and the sensed data acquired from the nearby vicinity of its own device. If the advanced determination device 560 determines that extension of the second communication network is available, the advanced determination device 560 requests the base station 500 for temporary grant of authority for permitting extension of the second communication network. At this time, the advanced determination device 560 transmits a determination result indicating that extension of the second communication network is available, data used for the determination or the like to the base station 500. If the authority is granted in accordance with the data or the like, the advanced determination device 560 starts provision of the second communication service with the extended network range to communication devices located in the nearby vicinity of its own device and the determination device 550.

In such a configuration of the communication system 5, it is possible to provide the second communication service in an area 508 including areas 504 and 506 by using an unused part (or whole) of the spectrum assigned to the first communication service. Because the sensed data of communication environment is exchanged by multi-hop between the determination device 550 and the advanced determination device 560, it is possible to determine the availability of extension of the service area of the second communication service based on the accurate grasping of the communication environment over a wider range. In this embodiment, either one or both of the determination device 550 and the advanced determination device 560 may further operate as the primary communication relay node (FC2). Further, although the case where the determination device 550 and the advanced determination device 560 are the temporary secondary communication authentication nodes is described above, the determination device 550 and the advanced determination device 560 may be the permanent secondary communication authentication nodes. If, in this embodiment, the determination device 550 or the advanced determination device 560 is the permanent secondary communication authentication node, the device which is the permanent secondary communication authentication node is not necessarily located inside the communication area 502 where the first communication service is provided.

The configurations of the communication systems 1 to 5 according to the first to fifth embodiments are described above by reference to FIGS. 2 to 13. Hereinafter, data transmitted and received between nodes in such communication systems is described.

<4. Example of Data Exchanged Between Nodes>

According to an embodiment of the present invention, the data transmitted and received between nodes largely involves two kinds of data: sensed data and control data.

[4-1. Sensed Data]

The sensed data is data that is related to the communication environment sensed by the sensor node or the smart sensor node described above. The target communication resources of sensing by the sensor node or the smart sensor node are communication resources, which there is a possibility that they are used by the first communication service, and represented by frequency channels, resource blocks, codes or the like. Which range of the communication resources should be sensed is, for example, determined by monitoring the downlink broadcast channel of the first communication service (such as PBCH of LTE or the like). The sensed data may contain an identifier of a device which has sensed a communication environment and a sensing result, and may further contain location data of a device acquired using a global positioning system (GPS), a kind of a sensing algorithm, a time stamp or the like. Further, link data that is obtained by statistically summarizing the sensed data, scheduling information indicating surrounding communication environment regarding the first communication service and the like can be contained in the sensed data in a broad sense.

The location data of a device is data indicating the location of a device which has sensed a communication environment at the time of sensing, for example. The location data is used for determination about the availability of secondary usage of a spectrum by the determination node (or the advanced determination node), for example. Specifically, the determination node downloads a location information database which is externally prepared in advance to its own device. The location information database contains channel assignment of the first communication service, channel usage history or the like in association with the location data. Thus, the determination node can retrieve channel assignment or channel usage history from the location information database by using the location data as a key, for example, and thereby evaluate the possibility that the secondary usage causes an adverse effect on the first communication service. Instead of downloading the location information database to its own device in advance, the determination node may make inquiry to an external database by using the location data as a key at the time of determining the availability of secondary usage, for example.

The kind of a sensing algorithm indicates what kind of value is to be sensed (or have been sensed), such as radio signal energy, a noise power level, a noise ratio (e.g. SNR or CNR) or an error rate (e.g. BER or PER), for example.

The sensing result contains the value of the sensing result according to the kind of a sensing algorithm described above. The value of the sensing result may be represented by soft bit (soft decision value) or hard bit (hard decision value). For example, it is preferred that the determination node (or the advanced determination node) represents the sensing result to be transmitted to the secondary communication authentication node by hard bit. In this case, a result of determining the availability of secondary usage according to the sensed value is represented by a logical value such as "0" or "1". This enables a decrease in traffic between nodes. On the other hand, the sensing result to be transmitted from the sensor node (or the smart sensor node) to the determination node (or the advanced determination node) is typically represented by soft bit.

The time stamp contains time when sensing of a communication environment is started, time when sensing of a communication environment ends or the like, for example.

[4-2. Control Data]

The control data is data that is used in order that one of the above-described nodes constituting the secondary usage system controls another node or one node receives control from another node. The control data can contain an instruction for start or stop of sensing, an instruction for transmission of sensed data, designation of the kind of a sensing algorithm, an instruction for transmission of the secondary communication profile, an access request to the location information database or the like, for example.

In the case where the advanced determination node, the determination node or the smart sensor node integrates the sensed data acquired from a plurality of nodes, information indicating by what method the sensed data is integrated, such as averaging or standard deviation, can be contained in the control data.

Further, the secondary communication authentication node, the advanced determination node or the determination node may evaluate the reliability of each sensed data by comparing the sensed data sensed or acquired by one node with the sensed data sensed or acquired by another node. For example, if sensing results sensed or acquired by a plurality of nodes located in close proximity vary widely, the reliability of the sensed data can be evaluated to be low. In such a case, the evaluation result of the reliability of the sensed data is included in the control data. Further, a node in the state of a hidden terminal may be detected by comparing the sensed data sensed or acquired by one node with the sensed data sensed or acquired by another node.

Further, the smart sensor node may exchange the control data such as upper limits of the allowable number of hops and the allowable number of sensor nodes and the minimum required number of sensor nodes with another smart sensor node. It is thereby possible to extend the sensing area to be used for the second communication service as well as maintaining a certain quality of the sensed data

[4-3. Selection of Communication Protocol]

In the case of transmitting or receiving the above-described sensed data or control data between the smart sensor nodes or between the advanced determination nodes, an autonomous distributed communication protocol such as IEEE802.11s or WiMedia may be used. Alternatively, a hierarchical management communication protocol such as Zigbee may be used according to control of the smart sensor node or the advanced determination node which has transmitted a beacon first. If the autonomous distributed communication protocol is used between nodes at the same level in the above-described function classifications FC1 to FC7, it is possible to easily change the topology of the secondary usage system in accordance with the location of devices. On the other hand, it is preferred to use the hierarchical management communication protocol according to control of a higher-order node between nodes at different levels in the function classifications FC1 to FC7.

The communication systems according to the first to fifth embodiments of the present invention and the communication devices constituting the respective communication systems are described in detail above by referring to FIGS. 1 to 13. According to any of the configurations of the communication systems described above, processing such as sensing of a communication environment for secondary usage of a spectrum, determination about the practicability of start of secondary usage or determination about the availability of extension of a range for secondary usage is performed in a dispersed manner by a plurality of communication devices. It is thereby possible to efficiently implement secondary usage of a spectrum.

The subject matter of each embodiment described in this specification is applicable to various types of modes of secondary usage. For example, as described above, it can be said that operation of relay node or femto-cell to cover a spectrum hole of the first communication service is a mode of secondary usage of spectrum. Further, the relationship between any one or more of macro-cell, RRH (Remote Radio Head), Hotzone, relay node, femto-cell and the like may form a mode of secondary usage of spectrum (such as heterogeneous network).

Although preferred embodiments of the present invention are described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The invention claimed is:

1. A communication system comprising:
    a first communication device configured to sense a communication environment surrounding the first communication device;
    a second communication device configured to acquire sensed data sensed by the first communication device; and
    a third communication device configured to
        determine availability of usage of a second communication service using a part or whole of resource blocks assigned to a first communication service based on the sensed data transmitted from the second communication device; and
        invite users of the second communication service by transmitting a beacon to nearby communication devices.

2. The communication system according to claim 1, wherein
    based on the sensed data, when a spectrum to be used by the second communication service is not actually used by the first communication service, the third communication device determines that the spectrum is available for the second communication service.

3. The communication system according to claim 2, wherein
when the third communication device determines that usage of the second communication service is available, the third communication device requests another communication device to permit start of usage of the second communication service.

4. The communication system according to claim 3, wherein
the third communication device transmits a result of hard decision on the sensed data to a communication device to which permission for start of usage of the second communication service is requested.

5. The communication system according to claim 1, wherein
the third communication device is a device permitted in advance to decide start of usage of the second communication service, and, when the third communication device determines that usage of the second communication service is available, the third communication device starts the second communication service.

6. The communication system according to claim 5, wherein
the third communication device further receives, from another communication device capable of determining availability of usage of the second communication service, sensed data acquired by said another communication device, and determines availability of extension of a service area of the second communication service based on the received sensed data.

7. The communication system according to claim 6, wherein
the sensed data acquired by said another communication device is sensed data sensed by yet another communication device.

8. The communication system according to claim 6, wherein
the third communication device evaluates reliability of each sensed data by comparing the sensed data acquired by a plurality of communication devices with one another.

9. The communication system according to claim 1, wherein
the second communication device transmits sensed data acquired by another communication device and sensed data acquired by the second communication device to the third communication device.

10. The communication system according to claim 9, wherein
the second communication device performs communication with said another communication device acquiring the sensed data by using an autonomous distributed communication protocol.

11. The communication system according to claim 1, wherein
the third communication device relays a communication packet for the first communication service transmitted from the first communication device or the second communication device to another communication device.

12. The communication system according to claim 1, wherein
the third communication device acquires regulatory information from another communication device and determines availability of usage of the second communication service based further on the regulatory information.

13. A communication device comprising:
a communication interface configured to receive sensed data related to a communication environment surrounding another communication device sensed by said another communication device; and
circuitry configured to
determine availability of usage of a second communication service using a part or whole of a spectrum assigned to a first communication service; and
control inviting users of the second communication service by transmitting a beacon to nearby communication devices.

14. A non-transitory computer readable storage medium storing instructions which, when executed by one or more processors of a computer controlling a communication device, causes the computer to:
receive sensed data related to a communication environment surrounding another communication device sensed by said another communication device; and
invite users of a second communication service by transmitting a beacon to nearby communication devices; and
determine availability of usage of the second communication service using a part or whole of a spectrum assigned to a first communication service.

15. A communication control method comprising:
sensing, by a first communication device, a communication environment surrounding the first communication device;
acquiring, by a second communication device, sensed data sensed by the first communication device;
inviting, by a third communication device, users of a second communication service by transmitting a beacon to nearby communication devices; and
determining, by a third communication device, availability of usage of a second communication service using a part or whole of a spectrum assigned to a first communication service based on the acquired sensed data.

* * * * *